(12) United States Patent
Allemand et al.

(10) Patent No.: US 6,266,177 B1
(45) Date of Patent: Jul. 24, 2001

(54) ELECTROCHROMIC DEVICES

(75) Inventors: Pierre Marc Allemand; Andrew Ingle; John P. Cronin; Steven R. Kennedy, all of Tucson, AZ (US); Yongjin Yao, Austin, TX (US); Juan Carlos Lopez Tonazzi, Tucson, AZ (US); Jonathan M. Boulton, Tucson, AZ (US); Anoop Agrawal, Tucson, AZ (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 09/443,109

(22) Filed: Nov. 18, 1999

(51) Int. Cl.$^7$ ........................................ G02F 1/15
(52) U.S. Cl. .................. 359/265; 359/269; 359/270; 359/273; 359/275; 252/500; 252/583
(58) Field of Search .................. 359/265, 267, 359/269, 270, 271, 272, 273, 275; 252/500, 583, 600

(56) References Cited

U.S. PATENT DOCUMENTS

| | | | |
|---|---|---|---|
| 4,671,619 | 6/1987 | Kamimori et al. | 350/357 |
| 4,712,879 | 12/1987 | Lynam et al. | 350/357 |
| 4,902,108 | 2/1990 | Byker | 350/357 |
| 4,938,571 | 7/1990 | Cogan et al. | 350/357 |
| 5,034,246 | 7/1991 | Mance et al. | 427/126.3 |
| 5,239,405 | 8/1993 | Varaprasad et al. | 359/272 |
| 5,277,986 | 1/1994 | Cronin et al. | 428/432 |
| 5,708,523 | 1/1998 | Kubo et al. | 359/269 |
| 5,721,633 | 2/1998 | Nagai et al. | 359/274 |
| 5,724,187 | 3/1998 | Varaprasad et al. | 359/608 |
| 5,725,809 | 3/1998 | Varaprasad et al. | 252/583 |
| 5,729,379 | 3/1998 | Allemand et al. | 359/270 |
| 5,780,160 | 7/1998 | Allemand et al. | 428/426 |
| 5,793,518 | 8/1998 | Lefrou et al. | 359/275 |
| 5,818,636 * | 10/1998 | Leventis et al. | 359/273 |
| 5,838,483 | 11/1998 | Teowee et al. | 359/265 |
| 5,859,722 | 1/1999 | Suga et al. | 359/265 |
| 5,910,854 * | 6/1999 | Varaprasad et al. | 359/273 |
| 6,002,511 * | 12/1999 | Varaprasad et al. | 359/265 |
| 6,055,088 * | 4/2000 | Fix et al. | 359/265 |
| 6,157,479 * | 12/2000 | Heuer et al. | 359/265 |
| 6,160,655 * | 12/2000 | Fix et al. | 359/265 |

FOREIGN PATENT DOCUMENTS

| | | | |
|---|---|---|---|
| 0612826A | 8/1994 | (EP) | C09K/9/02 |
| WO 97/22906 | 6/1926 | (WO) | G02F/1/153 |
| WO 94/15247 | 7/1994 | (WO) | G02F/1/153 |
| WO 95/31746 | 11/1995 | (WO) | G02F/1/15 |
| WO 96/13754 | 5/1996 | (WO) | G02F/1/15 |
| WO 97/22906 | 6/1997 | (WO) | G02F/1/153 |
| WO 97/38350 | 10/1997 | (WO) | G02F/1/16 |
| WO 97/45767 | 12/1997 | (WO) | G02F/1/153 |
| WO 98/08245 | 2/1998 | (WO) | . |
| WO 98/35267 | 8/1998 | (WO) | G02F/1/15 |
| WO 98/42796 | 10/1998 | (WO) | C09K/9/02 |
| WO 98/44384 | 10/1998 | (WO) | G02F/1/15 |
| WO 99/45081 | 9/1999 | (WO) | G02F/1/15 |

OTHER PUBLICATIONS

S.P. Sapers et al., "Monolithic Solid State Electrochromic Coatings for Window Applications," Proc. Of the Soc. Of Vacuum Coaters Conference (1996).
A.F. Wells, Structural Inorganic Chemistry, (5$^{th}$ ed., Oxford University Press, Oxford, United Kingdom 1991).
M.K. Nazeeruddin et al., *J. Am. Chem. Soc.,* vol. 115, p. 6382 (1993).
T.J. Gudgel et al., "TiO$_2$ Films for User Controlled Photochromic Applications," Proceedings of the SPIE (Society of Photo Optical Instrumentation Engineers, Bellingham, Washington), vol. 3788 (1999).

* cited by examiner

Primary Examiner—Loha Ben
(74) *Attorney, Agent, or Firm*—Fitzpatrick, Cella, Harper & Scinto

(57) ABSTRACT

Electrochromic devices incorporate reversible oxidizers to improve device kinetics, incorporate counterelectrodes composed of an alkali metal oxide and vanadium oxide to improve stability, and doped tungsten or molybdenum oxide in the electrochromic layer to improve UV durability.

25 Claims, 8 Drawing Sheets

A = Bleached spectrum of cell with $Li_{0.5}W_{0.5}O_y$
B = Colored spectrum of cell with $Li_{0.5}W_{0.5}O_y$
C = Colored spectrum of cell with $Li_{0.3}W_{0.7}O_y$

ELECTROCHROMIC DEVICES

BACKGROUND OF THE INVENTION

1. Field of the Invention

The present invention relates to electrochromic devices that have improved kinetics, improved counterelectrodes, and improved resistance to degradation from ultraviolet (UV) radiation. In particular, the present invention relates to electrochromic devices that incorporate i) reversible oxidizers to improve device kinetics, ii) counterelectrodes composed of an alkali metal oxide and vanadium oxide to improve stability, and iii) an electrochromic layer formed from doped tungsten or molybdenum oxide to improve UV durability.

2. Related Background

Electrochromic (EC) devices are used to make variable transmission and reflection glazing and mirrors that may be used for example in automotive and architectural applications. These EC devices can also be fabricated as light filters and displays for a variety of uses. Such devices can be used for energy efficient windows (architectural and transportation), skylights, automotive mirrors, displays, lighting control filters, etc. EC devices color and/or darken in response to an electric voltage. There are several types of electrochromic devices used to modulate light in a variety of applications. Most electrochromic devices have at least one electrochromic electrode which typically reversibly changes color upon ion insertion (reduction). For example, electrochromic devices may include i) an electrochromic layer (electrode) and ii) a redox material incorporated in an electrolyte layer. Many EC devices have another type of construction in which a liquid electrolyte or a polymeric solid electrolyte separate two electrodes, where at least one is electrochromic and where the other is a counter electrode (which could also be electrochromic) for ion insertion (see e.g., FIG. 1). The electrolyte may further include an anodic or cathodic dye. Many EC devices may also incorporate multiple thin coatings on one substrate.

Various examples of EC devices are found, for example, in U.S. Pat. No. 5,239,405 which describes electrochemichromic solutions, U.S. Pat. No. 4,902,108 which describes a single-compartment, self-erasing, solution- phase EC device, U.S. Pat. No. 5,729,379 which describes electrochemically active polymers, U.S. Pat. No. 5,780,160 which describes EC devices employing an electrochromically-inert reducing or oxidizing additive, U.S. Pat. No. 5,724,187 which describes EC devices containing redox reaction promoters, U.S. Pat. No. 4,671,619 which describes electrolytic solutions containing an iodide source material as a redox reaction promoter, and U.S. Pat. No. 5,725,809 which describes EC windows containing an ultraviolet stabilizer. Other examples are found in International Patent Publication WO 98/42796 which describes electrochromic polymeric solid films, International Patent Publication WO 97/38350 which describes an EC device containing a selective ion transport layer, and International Patent Publication WO 98/44384 which describes an EC device containing electroactive materials having a preselected perceived color. The disclosures of the above patents and publications are incorporated by reference herein.

The kinetics in EC devices, such as their bleaching and/or their coloration rates, disadvantageously decrease when the electrolyte thickness is increased because the electron carrier ions must travel longer distances. Therefore, it would be desirable to develop additives that, when added to the electrolyte, improve the coloration kinetics.

Further, it would be desirable to develop devices in which the coloration kinetics are insensitive to the gap (electrolyte thickness) between the electrodes. For example, in applications where curved glass is used over large areas (such as in automotive glass windows), large gaps of about 0.5 to 3 mm might be preferred between the glass plates. However, the glass bending tolerances can cause the interglass gap to vary from 10 to 50%. Such variations in the interpane gap distance can disadvantageously lead to non-uniform color due to the different coloration/bleaching rates for each gap distance. Devices having coloration kinetics that are insensitive to the gap would not exhibit such color variations.

A typical chromogenic layer utilized in EC devices such as a window is composed of, for example, tungsten oxide deposited on a transparent conductive substrate. A typical redox material used in the electrolyte is, for example, ferrocene. This electrolyte is sandwiched between the tungsten oxide layer described above and another transparent conductive substrate. When the EC cell is colored by applying an appropriate coloring potential, the tungsten oxide is reversibly reduced to a colored compound, tungsten bronze, while the ferrocene is reversibly oxidized to ferrocenium at the counterelectrode. When the bleaching potential is applied, (or under bleaching conditions) the ferrocenium oxidizes the tungsten bronze back to tungsten oxide, while the ferrocenium is itself reduced to ferrocene. The rate of such oxidation (or the bleaching rate) will depend in large part on the concentration of the ferrocenium near the bronze layer, the rate of transportation of ferrocenium through the electrolyte layer and the strength of ferrocenium as an oxidizer. Accordingly, it would be desirable to enhance the bleaching rate of EC devices in order to enhance their kinetics.

As described above, electrochromic devices can reversibly change light transmission or coloration when an electrical stimulus is applied. In many applications, electrochromic devices are subjected to not only visible and IR radiation but also UV radiation. Continued exposure to UV radiation can disadvantageously cause deterioration of materials and components, thereby leading to deterioration of the properties of the EC device. Thus, it would be desirable to minimize the change and/or degradation of these devices when subjected to UV radiation.

Many of the semiconductor materials utilized in EC devices can interact with other layers of the EC devices. For example, the semiconductor materials can undesirably interact with the electrolyte and transparent conductor layers when exposed to UV to shorten the EC devices' useful lifetimes. One of the effects from exposure to UV is the reduction in the transmission/reflection of the EC devices. This effect may be called "photochromism". Even more undesirably, the photochromism effect can be irreversible, i.e., cannot be reversed by applying a bleaching potential to the EC devices.

As described above, most electrochromic devices have at least one electrochromic electrode (an electrochromic or EC layer) that typically changes color reversibly upon ion insertion (reduction). Many EC devices use oxides of tungsten, molybdenum, or niobium as such electrochromic electrodes. The tungsten, molybdenum, or niobium oxides are often mixed with other oxides to change their color in at least one of colored and bleached states, spectral characteristics, ion-insertion/extraction properties, color/bleach rates, reversibility, durability, etc. It would be particularly desirable to eliminate photochromism in such EC devices which use at least one layer having a composition that includes tungsten oxide and/or molybdenum oxide and/or niobium oxide.

A typical prior art electrochromic device 17 is shown schematically in FIG. 1. EC device 17 can be used, for example, as a window. EC device 17 is in the form of a sequence of layers. A substrate 16 is adjacent to a transparent conductor layer 12' which abuts a counterelectrode (CE) 15. An electrolyte layer 14 is disposed between the counterelectrode and an electrochromic layer 13, which abuts a transparent conductor 12, which is adjacent to a substrate 11.

In a typical EC device, substrates 11 and 16 are often glass or a polymeric material, transparent conductor layers 12 and 12' are often formed from coatings of indium tin oxide or doped tin oxide, and electrochromic (EC) layer 13 is often an oxide (e.g., tungsten oxide, molybdenum oxide, etc.).

EC device 17 is typically constructed by taking two substrates 11 and 16 that are each already coated respectively with transparent conductors 12 and 12'. On the 11/12 coated substrate, EC coating 13 is deposited over the conductor coating. On the other coated substrate 16/12', CE coating 15 is deposited over the conductor coating. One of the coated substrates may be pre-reduced by ion-insertion. The two doubly coated substrates are then assembled together by, for example, lamination with an electrolyte or an ion-conductive layer therebetween. Examples of such devices are found in International Patent Publication WO 95/31746 which describes an electrochromic pane arrangement, International Patent Publication WO 97/22906 which describes an electrochromic element, and in U.S. Pat. No. 5,793,518 which describes an electrochromic system, the disclosures of each of which are incorporated by reference herein.

Another way in which EC devices with counterelectrodes are fabricated is by sequential deposition of thin films on one substrate. Schematically such devices resemble FIG. 1, but without second substrate 16. Examples of such devices are described in International Patent Publication WO 94/15247 which describes EC devices utilizing optical tuning layers, U.S. Pat. No. 4,712,879 which describes an EC mirror, S. P. Sapers, et al., "Monolithic Solid State Electrochromic Coatings for Window Applications", Proc. of the Soc. of Vacuum Coaters Conference, 1996, and U.S. Pat. No. 5,721,633 which describes a wholly solid type EC device, the disclosures of each of which are incorporated by reference herein. It would be desirable to produce novel coatings which can be used as improved counterelectrodes in EC devices employing at least one of tungsten, molybdenum oxide and niobium oxide, as EC coatings. Particularly, it would be desirable to produce novel counterelectrodes, for EC devices, with improved stability in the range of environments to which such devices are exposed. Some of these counterelectrodes reversibly change their color when they are reduced or oxidized in the devices.

The structure of the above described EC device is similar to a typical secondary (rechargeable) battery. In the above described devices, the EC layer is intercalated (charged or reduced) in the colored state of the device. That is, electrons are inserted into the EC layer from the counterelectrode in the coloration process or state. In the bleached state, the ions and the concomitant electrons are extracted from the EC layer and inserted into the counterelectrode. This process is again reversed for coloration.

Following the above analogy to secondary batteries, a counterelectrode commonly used for secondary batteries is vanadium oxide formed by processing the powder at high temperature (e.g., 500° C. to 1500° C.). The thus formed vanadium oxide(s) are then combined with other additives and binders before being applied as layered pastes onto metallic electrodes. Such vanadium oxide electrodes are typically opaque and dark in color due in part to the presence of sulfur compounds and carbon black powders. Although such optical properties are acceptable for batteries, typical EC device applications require that the electrodes possess optical clarity and optical uniformity—even after processing. Vanadium oxide ($V_2O_5$) is used in certain EC devices as counterelectrodes although it is deep yellow in color. It would be desirable to change or vary the optical properties of such counterelectrodes.

Vanadium oxide can be modified by doping with other oxides, e.g., formation of vanadates. Many such materials are known, as described in A. F. Wells, *Structural Inorganic Chemistry*, $5^{th}$ edition, Oxford University Press, Oxford, United Kingdom, 1991. Nevertheless, another disadvantage to the existing counterelectrodes utilizing vanadium oxide is the high processing temperatures required. To preserve the mechanical, chemical and functional integrity of the conductive substrates (e.g., soda-lime glass or plastic coated with transparent conductive coatings) used for EC devices, processing temperatures lower than 500° C. are desirable. Accordingly, it would be desirable to produce compositions and processing methods for counterelectrodes that are useful in EC devices—including counterelectrodes containing modified vanadium oxides—that utilize lower processing temperatures.

A wet chemical method to add copper to tungsten oxide is described in U.S. Pat. No. 5,034,246. The patent describes adding a pyridine solution of Cu(II) acetylacetonate to a solution containing alkyl amine tungstate in order to produce a tungsten oxide film containing copper. The patent, however, does not discuss any benefits from such addition of copper. Nor does the patent discuss what the form of the copper was —whether the copper was in the final coating as an oxide or as elemental copper in a nano-composite.

Further, the patent does not provide any specific disclosure of the conditions necessary to perform the described copper addition.

SUMMARY OF THE INVENTION

This invention is directed to a method to enhance the kinetics of electrochromic devices by adding an augmenting amount of an oxidizer or reducer to the electrolyte layer of the electrochromic device. This invention is also directed to an electrochromic device having an electrochromic layer and an electrolyte layer abutting the electrochromic layer in which the electrolyte layer contains an augmenting amount of an oxidizer or reducer effective to enhance the bleaching rate of the electrochromic layer. Most preferably, an augmenting amount of oxidizer is used in combination with an electrolyte layer comprising an anodic compound and a cathodic electrochromic layer.

As used herein, the augmenting amount of oxidizer employed when the device has a cathodic electrochromic layer is an oxidizer having an oxidation number which is higher than the oxidation number of the redox material incorporated in the electrolyte layer. Coversely, the augmenting amount of reducer employed when the device has an anodic electrochromic layer is a reducer having an oxidation number which is lower than the oxidation number of the redox material incorporated in the electrolyte layer. T his invention is also directed to electrochromic devices that exhibit reduced photochromism by using a layer composed of tungsten oxide or molybdenum oxide. The tungsten or molybdenum oxide may be doped with oxides of at least one of lithium, sodium, or potassium.

Yet another embodiment of this invention is directed to electrochromic devices that exhibit reduced photochromism by using an oxide layer composed of an oxide which has at least one of an element of Group 2A or an oxide of the $4^{th}$ period in a standard periodic table of the elements. The Group 2A or 4th period oxide layer is situated between i) a transparent conductor layer and ii) an electrochromic layer such as tungsten oxide or molybdenum oxide layer of the electrochromic device.

This invention is also directed to UV resistant electrochromic layers that may be selected from compositions described by the formulas:

p(oxide of $M_1$)+q(oxide of $M_2$)+r(oxide of $M_3$)  (I)

q(oxide of $M_4$)+r(oxide of $M_3$)  (II)

wherein $M_1$ is at least one of lithium, sodium, or potassium; and $M_2$ is at least one element of Group 2A or an element of the $4^{th}$ period in a standard periodic table of the elements. However, the preferred elements are barium, vanadium, chromium, cobalt and copper.

$M_3$ is at least one of tungsten or molybdenum.

$M_4$ is at least one of barium, chromium, cobalt or copper.

For compositions (I) and (II) the atomic ratio p/r of $M_1$ to $M_3$, is in the range of from about 0.01 to about 2; and for composition (II) the atomic ratio q/r of $M_4$ to $M_3$ is in the range of from about 0.001 to about 0.5. PCT application WO 9908153 describes addition of zirconium oxide to tungsten oxide so that its color in the colored state (i.e., reduced state) is neutral rather than blue. Such mixtures or any other mixtures where additives are used to change the spectral or other properties of tungsten, niobium and molybdenum oxides will also benefit from this invention by further incorporating the inventive oxides described herein.

Yet another embodiment of this invention is directed to a counterelectrode having a composition selected from the formulas:

x(oxide of $M_5$)+y(oxide of $M_6$)+z(oxide of vanadium)  (III)

x(oxide of $M_5$)+z(oxide of vanadium)  (IV)

wherein $M_5$ is at least one of lithium, sodium, potassium, rubidium, or cesium, provided for composition (IV), $M_5$ may not be sodium unless $M_5$ is a mixture of oxides;

$M_6$ is at least one of barium, tantalum, copper, niobium, rhenium, titanium, cesium, cobalt, nickel, irridium or chromium;

the atomic ratio x/z of $M_5$ to vanadium is in the range of from about 0.01 to about 1; and the atomic ratio y/z of $M_6$ to vanadium is in the range of from about 0.1 to about 0.8.

Another embodiment of this invention includes a counterelectrode formed from a composition described by formula:

y(oxide of $M_7$)+z(oxide of vanadium)  (V)

wherein $M_7$ is at least one of barium, copper or rhenium; and the atomic ratio y/z of $M_7$ to vanadium is in the range of from about 0.1 to about 0.8. Preferably the composition is formed by a liquid phase reaction, e.g., using sol-gel or a wet chemical deposition technique of a liquid precursor onto a substrate.

DETAILED DESCRIPTION OF THE INVENTION

Figure 7:
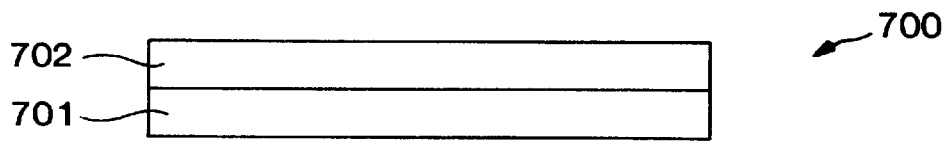
FIG. 7 is a schematic diagram of an electrochromic device of this invention.

Referring to FIG. 7, an electrochromic device 700 includes a chromogenic layer 701 (for example tungsten oxide which colors upon reduction) and an electrolyte layer 702 incorporating a redox material (such as ferrocene). The redox material (in this example, metallocene, in particular ferrocene) includes a reducing and oxidizing form (in this example, ferrocenium is the oxidizing form and ferrocene is the reducing form). Typically, the uncolored oxide is converted to a colored bronze to produce a chromogenic effect. An important factor in the overall kinetics of EC devices is the rate that the colored bronze is oxidized back to the uncolored oxide. The rate of such oxidation (or the bleaching rate), among other parameters, will depend importantly on the concentration of ferrocenium near the bronze layer and the strength of ferrocenium as an oxidizer. Accordingly, in one aspect, this invention enhances the kinetics of EC devices by enhancing the bleaching rate.

The bleaching rate is enhanced by forming electrolyte layer 702 containing an increased or augmented concentration of reversible oxidizer.

To enhance the kinetics is to increase the rate at which a reaction occurs, as measured by a physical manifestation of the reaction. Such manifestations include, for example, the amount of darkening over a period of time (kinetics of coloring), and the amount of lightening over a period of time (kinetics of bleaching). Accordingly, enhancing the bleaching rate means achieving a measured amount of lightening over a shorter time period than that time period required for the same amount of lightening at the unenhanced bleaching rate. As an example, if it takes 180 seconds for an unmodified device to lighten from 25% T to 60% T at a particular bleaching voltage $V_{bleaching}$, then the bleaching rate is enhanced if the device when modified achieves a change from 25% T to 60% T at $V_{bleaching}$ in a time shorter than 180 seconds.

This invention enhances the bleaching rate by increasing or augmenting the reversible oxidizer (for example, ferrocenium) concentration in electrolyte layer 702. Thus, for a given oxidizer, its oxidation potential relative to the bronze and other such colored species present in the electrolyte is increased by conveniently adding an effective augmenting amount of the oxidizer ion to electrolyte layer 702, thereby enhancing the bleaching rate. This oxidizer is present in the EC cell in the bleached state. For example, ferrocenium can be conveniently added by adding its salt to the electrolyte. Such oxidized metallocene salts, e.g., ferrocenium salts include, for example, ferrocenium hexafluoro phosphate, and ferrocenium tetrafluoro borate.

In the case of other reducing agents other than ferrocene such as, for example, $I^-$ (iodide) or tetramethylphenylenediamine (TMPD), their respective oxidizing forms would be $I_2$ (iodine) and $TMPD^+$. Accordingly, this invention would add effective augmenting amounts of the oxidizer to the electrolyte layer, thereby enhancing the bleaching rate. Such species can be conveniently added to the electrolyte. Such species includes, for example, $I_2$ and $[TMPD^+ \cdot ClO^-_4]$.

The choice of such an oxidizer to be added to electrolyte layer 702, however, containing a reducing compound is not limited to the corresponding oxidizing ion or salt. Any convenient reversible oxidizer that will oxidize the bronze (for example, tungsten bronze) may be used. For ferrocene, for example, the oxidizer could be a salt of the ferrocenium derivative (e.g., butyl ferrocenium salt). However, the oxidizer can even be unrelated to ferrocene (that is, not contain iron). Examples of such oxidizers include tetracyanoquinodimethane (TCNQ), dichlorodicyanobenzoquinone (DDQ), iodine ($I_2$), and copper$^{(2+)}$ triflate.

In general, the augmenting amount of oxidizer, e.g., ferrocenium should be in a molar ratio in the range of from about 0.01 to about 0.5, preferably from about 0.02 to about 0.1 of the concentration of the reducing compound, e.g., ferrocene.

Some of the kinetics-enhancing additives described above also promote the UV stability of the devices by oxidizing bronzes undesirably formed from the photochromic interaction of the materials in the EC device with solar radiation. In one embodiment of this invention, additives are utilized that are activated in the presence of UV (UV active oxidizers) whereby, when activated, the additives become oxidizers of such undesirably formed bronzes. Such oxidizers include, for example, 2,4,6-triphenylpyrylium tetrafluoro borate, [2,4,7-trinitro-9-fluoroenone] and $C_{60}$(fullerene).

In general, the augmenting amount of UV active oxidizer should be in the same range as the oxidizers described above.

For those EC devices where the electrochromic layer colors by oxidation (e.g. polyaniline and its derivatives) and where the electrolyte includes a redox material in an oxidizing form, the bleach rate may be enhanced by adding a redox agent in the reducing form to enhance the bleach rate.

Figure 8:
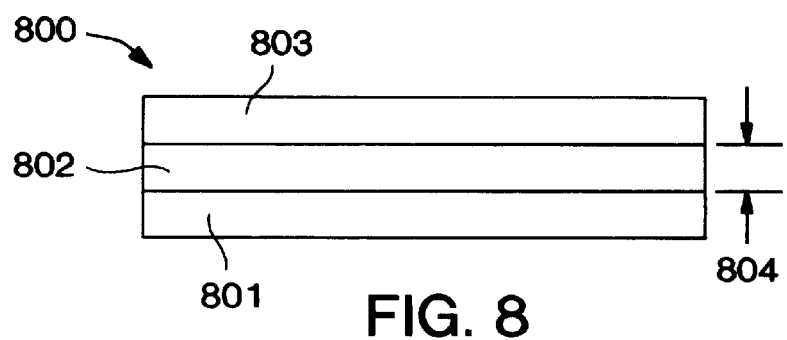
FIG. 8 is a schematic diagram of an electrochromic device of this invention.

Referring to FIG. 8, another EC device 800 of this invention has an electrolyte 802, containing at least one anodic compound, one cathodic compound, and an augmenting amount of oxidizer. Electrolyte 802 is enclosed in a gap 804 between a conductive layer 801 and conductive layer 803.

This invention could be used for any convenient gap distance by utilizing a convenient augmenting amount of oxidizer effective to cause an acceleration in cell kinetics. An acceleration in cell kinetics is readily determined by one skilled in the art by measuring and comparing the time durations required for bleaching from one coloration to a bleached coloration—with and without added oxidizer. An effective augmenting amount of oxidizer shortens the measured time duration. Generally, augmenting amounts of oxidizers in the concentration range described above are effective for gaps in the range of 0.05 mm to 5 mm, for which acceleration in cell kinetics (color and/or bleach) is expected.

Other additives such as water, acids (e.g. phosphoric acid), dissociable salts (e.g., salts of lithium sodium and potassium), UV stabilizers (such as benzotriazole, benzophenone, salicyclates, nickel salts, benzoates, formamidines, oxalanilides, hindered amines and diphenylacrylate), thickeners (e.g.,polymers such as polymethylmethacrylate and vinylidene fluoride resins (e.g., various Kynar grades produced by Elf Atochem North America, Philadelphia, Pa.), fume silicas and other fumed oxides, and particulate fillers), polymerizable monomers (e.g., isocyanates, polyols, silicones, acrylates) and crosslinkers (e.g., photoinitiators, thermalinitiators, catalysts and curing agents) may be employed with electrolytes used in the devices of this invention. The electrolyte may be converted to a polymeric solid after filling the cell with a liquid monomer composition or the two substrates may be laminated using a preformed electrolyte solid polymeric sheet. The solid electrolyte sheet can consist of the components described above. Such use is shown, for example, in the patents and patent applications incorporated by reference above.

In the configurations of the EC devices of this invention utilizing one or more substrates, typical substrates used include glass, plastic, or metal. Substrates which are colored (either the glass substrates themselves are colored and/or have colored coatings underneath the transparent conductor) can also be used. Some examples of glass substrates include soda lime glass, borosilicate glass, AZURLITE glass, GL20 and GL35 (PPG Industries, Pittsburgh, Pa.), KRYSTAL KLEAR glass from (AFG Industries, Kingsport, Tenn.), and GALAXSEE and EZ-KOOL from Libbey Owens Ford (Toledo, Ohio). The coatings underneath the transparent conductor may also possess UV blocking characteristics as described in U.S. Pat. No. 5,859,722, which is incorporated by reference herein. Further, transparent conductors that may be used in the EC devices of this invention are well known. For example, indium/tin oxide coatings and fluorine doped tin or zinc oxide coatings can be used. Fluorine doped tin oxide coatings are available from Libbey Owens Ford (Toledo, Ohio) under the trade name of TEC, while fluorine doped zinc oxide coatings are described in International Patent Publication WO 98/08245. Colored glass such as TEC where color is imparted from either the bulk glass or from one of the coatings underneath the conductive coating can also be used as a substrate for these devices.

In a similar aspect of this invention bleach speed is increased in EC devices having a layer composed of tungsten oxide, molybdenum oxide, or niobium oxide by adding at least one alkali metal oxide, $M_1$, thereto. $M_1$ is preferably chosen from Li, Na and K.

Additionally, the doped layer of this invention can be formed from the composition described below to provide UV resistant properties to the EC layer. The UV resistant compositions can be utilized in EC device 900 in doped layer 902.

Preferred compositions of UV resistant electrochromic layers of this invention may be selected from the following compositions:

Composition 1: $pM_1O+qM_2O+rM_3O$ (I)

Composition 2: $qM_4O+rM_3O$ (II)

In the above compositions I and II:
i) "O" means "oxide" and does not indicate any particular stoichiometry of oxygen relative to $M_1$, $M_2$, $M_3$ and $M_4$.
ii) M1 is at least one of the alkali atoms chosen from Li, Na and K.
iii) $M_2$ is defined as those elements of Group 2A and those elements of the $4^{th}$ period in a standard periodic table of the elements. Preferably, the oxides formed from the $4^{th}$ period are those formed from elements having atomic number 45 (scandium) to atomic number 65 (zinc). Preferably, the oxide from Group 2A is barium oxide. The most preferred oxides are those formed from the elements Ba, V, Cr, Co, and Cu.
iv) $M_3$ is at least one of W and Mo.
v) $M_4$ is Ba, Cr, Co, and Cu.

For composition I, the atomic ratio of p to r ("p/r", the atomic ratio of $M_1$ to $M_3$) is in the range of from about 0.01 to about 2, preferably in the range of from about 0.1 to about 1. For compositions I and II, the atomic ratio (q/r) is in the range of from about 0.001 to about 0.5, preferably in the range of from about 0.01 to about 0.2. Other elements can be included in the above compositions (such as an oxide of another element not mentioned here) in addition to $M_1$, $M_2$, $M_3$, and $M_4$ but nevertheless the above defined atomic ratios will still hold. The above compositions are utilized as coatings that may be amorphous or crystalline, and may also be hydrated. Hydrated means that the composition contains OH groups and/or water.

Figure 9:
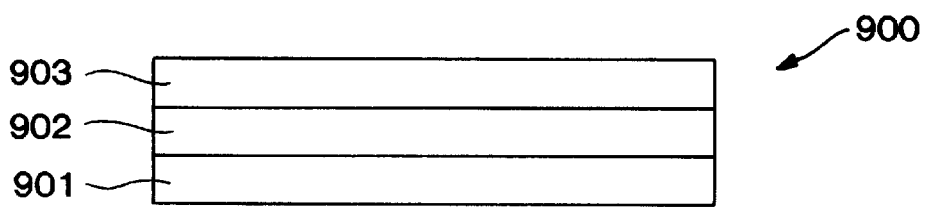
FIG. 9 is a schematic diagram of an electrochromic device of this invention.

In one embodiment, referring to FIG. 9, an EC device 900 includes a doped layer 902 composed of such $M_1$ doped tungsten or molybdenum oxide formed between a transparent conductor layer 901 and an EC layer 903 to reduce photochromism. EC layer 903 can be omitted, with doped layer 902 then serving as a doped EC layer of this invention.

The composition and/or microstructure of doped layer 902 can be different compared to EC layer 903. For example, layer 902 can be crystalline and layer 903 amorphous. Layers 902 and 903 may be processed differently to form a different crystal structure, density, amount of crystallinity, etc. As an example layer 902 may be processed in excess of 300° C. whereas layer 903 is processed at lower temperatures to achieve the desired microstructure. The composition of doped layer 902 could be chosen from one of compositions 1 and 2 listed above, or could be any oxide (including mixtures of oxides) as long as one of the components in the layer is chosen from chromium oxide, cobalt oxide, barium oxide and copper oxide. The preferred range of thickness of doped layer 902 is between about 5 nm and about 100 nm, but any thickness which would lead to improved device performance can be used.

The doped layer disclosed in this invention can be used in many different types of EC devices, such as i) those EC devices employing other redox promoters in the electrolyte as described in U.S. Pat. No. 5,724,187 which describes EC devices containing redox reaction promoters, and U.S. Pat. No. 4,671,619 which describes electrolytic solutions containing an iodide source material as a redox reaction promoter, and International Publication No. WO 97/38350 which describes an EC device containing a selective ion transport layer; ii) those EC devices having a counterelectrode but separated by an electrolyte as described in U.S. Pat. No. 5,708,523 which describes a counterelectrode containing a plurality of electrically conductive dots, and International Patent Publication Nos. WO 97/22906 which describes an electrochromic element, and WO 95/31746 which describes an electrochromic pane arrangement; and iii) those EC devices that have all thin coatings only on one substrate as described in U.S. Pat. No. 4,712,879 which describes an EC mirror, International Patent Publication No. WO 94/15247 which describes EC devices utilizing optical tuning layers, and in S. P. Sapers, et al., "Monolithic Solid-State Electrochromic Coatings for Window Applications", Proceedings of the Society of Vacuum Coaters Conference 1996). All these references are incorporated herein by reference.

Figure 10:
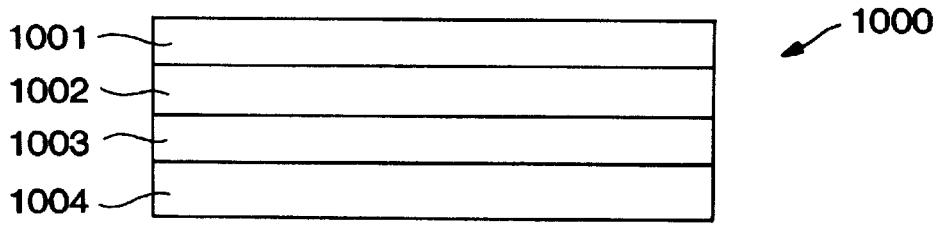
FIG. 10 is a schematic diagram of an electrochromic device of this invention.

Referring to FIG. 10, an EC device 1000 of this invention is shown which includes a transparent conductor 1001, an EC layer 1002, an electrolyte layer 1003, and an ion storage electrode 1004. Ion storage electrode 1004 is also known as a counterelectrode. EC layer 1002 can be formed from, for example, tungsten oxide, molybdenum oxide, niobium oxide, or their mixtures.

The counterelectrodes utilized by this invention are characterized by the following general formulas:

$xM_5O+yM_6O+zVO$ (III)

and

$xM_5O+zVO$ (IV)

where "O" indicates "oxide" of $M_5$, $M_6$ and vanadium and does not indicate any particular stoichiometry of oxygen relative to $M_5$, $M_6$, and V. These oxide compositions may or may not be hydrated. Hydrated means that they contain OH groups and/or water. $M_5$ represents at least one of the alkali elements in Group 1A of the periodic table (e.g., Li, Na, K, Rb, and Cs). $M_6$ represents at least one of Ba, Ta, Cu, Nb, Re, Ti, Ce and Cr. The factors x, y, and z represent the stoichiometric relationship amongst these elements. Taking a ratio of one to another provides the atomic ratios of the associated term. For example, x/z provides the atomic ratio of $M_5$ to V. For Composition IV, $M_5$ may not be sodium unless $M_5$ is a mixture of oxides.

Without being bound to the theory, it is believed that the addition of $M_5$ improves the stability of the framework and opens the oxide network. Some of the preferred elements are lithium, sodium and potassium. These materials could be amorphous (including distorted octahedral and the framework structure) or could be micro-crystalline as measured by x-ray diffraction. It is preferred that the atomic ratio (x/z) range from about 0.05 to about 1, and the ratio (y/z) range from about 0.1 to about 0.8.

Other EC devices of this invention utilize counterelectrodes formed from compounds produced from a liquid phase chemical reaction. The compounds are described by the chemical formula:

$yM_6O+zVO$ (V)

where $M_6$ is Ta, Cr, Nb or Ti.

Some of the compounds of equation (V) are described in U.S. Pat. No. 4,938,571 utilized in an all solid-state EC device having a source of charge compensating ions and an inorganic counterelectrode. The patent, however, describes the use of a physical vapor deposition (PVD) process to form the compounds.

In the present invention, by contrast, a wet-chemical route is utilized that forms the composition from a liquid phase reaction. The wet-chemical method is an advantageous route to deposit these $yM_6O+zVO$ oxides, as well as other compositions disclosed herein, particularly because it is easier in the wet-chemical method to control the micro-structure, chemical composition and uniformity of the various metals in the coatings in order to form a coating having a morphology characterized by an amorphous or crystalline state including crystals less than 10 nanometers in size imbedded in an amorphous matrix. Further, depending on the details of the chemistry of the coating precursors and the processing conditions one could control porosity (thus the density and the refractive index) and structure (amorphous, microcrystalline, crystal size, etc.) of the coatings. The porosity is preferably about 5% to about 70%. Since many EC applications are for large area devices such as light filters (e.g., in displays), automobile and architectural glazing, this method can be used to process such coatings at a relatively small capital cost as compared to PVD.

The porosity was established by measuring the thickness of the coating by a surface profilometer. The number of tungsten atoms per unit area were calculated from Rutherford back scattering (RBS). Percentage porosity was then calculated as the number of tungsten atoms per unit area divided by the number of tungsten atoms expected for a similar thickness 100% $WO_3$ single crystal.

Other elements (such as an oxide of another element not mentioned above) can be included in addition to $M_5$, $M_6$ and V in any of the above compositions (III), (IV), and (V). One could formulate counterelectrodes without departing from the teaching of this patent as long as vanadium concentration (atomic concentration based on total cations in the coating) in the counterelectrode coatings is greater than 35% and the atomic ratios of $M_5$ to $M_6$; $M_6$ to V; and $M_5$ to V are within the ranges disclosed above.

The compositions of this invention reduce and/or change the yellow color typical of undoped vanadium oxide while still retaining durability maintaining or exceeding required electrochemical characteristics (cyclability, charge capacity, potentials for oxidation and reduction).

These counterelectrodes have excellent optical properties, cyclability, charge capacity and are stable in both the reduced and the oxidized states for prolonged duration and within the environment that an EC device such as an automotive or architectural glazing may be subjected to.

The counterelectrodes of this invention can be used for any electrochromic device where the coloration in the device is principally due to an EC layer (electrochromic electrode) that colors upon reduction (e.g., intercalation by at least one of $H^+$, $Li^+$, $Na^+$, etc., with a simultaneous injection of electrons). The counterelectrodes of this invention are particularly useful in EC devices that incorporate an electrochromic layer composed of tungsten oxide and/or molybdenum oxide at more than 20 mole %. The counterelectrodes can also be utilized in a variety of EC devices, including those in which other oxides are added to the tungsten oxide and/or molybdenum oxide to change the color, spectral characteristics, ion-insertion/extraction properties, color/bleach rates, reversibility, durability, etc of the EC device.

Another embodiment of this invention is direct to counterelectrodes and electrochromic electrodes with dyes attached to inorganic oxides which can be used in the EC cells. For example, if tungsten oxide or any other cathodically coloring oxide (described previously) is used in an EC cell, the counterelectrodes can be anodic organic or metallorganic dyes which are put in an inorganic oxide host matrix. The dyes may modulate light in one of the ultraviolet, visible and infra-red spectrum of the solar radiation. Some example of dyes which modulate in the infrared are discussed in WO99/45081. These dyes may require further chemical modification to attach groups so that they can be anchored to the inorganic oxide surfaces. Such modification has been described and is known for other dyes. In principal all the inorganic oxide counterelectrodes described earlier in this disclosure can be used. The inorganic oxide matrices may be of single inorganic materials or mixtures. Some of the preferred inorganic oxides useful for housing anodic dyes are silicon oxide, titanium oxide, zirconium oxide, vanadium oxide, niobium oxide, nickel oxide, cobalt oxide, chromium oxide, cerium oxide, zinc oxide, aluminum oxide, tin oxide, indium oxide, antimony oxide, manganese oxide. These oxides may further be combined with oxides of alkali metals from Group 1 of the periodic table of elements. Electronically conductive oxides such as fluorine doped tin oxide, antimony doped tin oxide, tin doped indium oxide and aluminum doped zinc oxide can also be used. The conductivity of these oxides for dye interaction can range from 10,000 ohms/□ to 1 ohm/□. These electronically conductive oxides may be further deposited on pre-formed conductive substrates, or may be attached to the pores of the transparent conductor itself. Some transparent conductors with surface porosity are TEC 15 and TEC 8 from Libbey Owens Ford and Comfort E2 and TCO12 from AFG in Kingsport, Tenn.

These counterelectrodes and electrochromic electrodes with dyes attached to inorganic oxides can be made in several ways. One could deposit the inorganic oxide coating first and then attach the inorganic dye on its surface by dipping these in solutions of organic dyes. Such methods are described in a solar cell, photochromic and electrochromic devices where ruthenium dyes or other dyes are attached to the titania substrates. See, e.g., M. K. Nazeeruddin, et al., *J. Am. Chem. So.*, 115 (1993) 6382; U.S. Pat. No. 5,838,483 (G. Teowee et al); WO98/35267 (D. Fitzmaurice et al); and WO97/45767 (C. S. Bechinger et al.). To increase the surface area of attachment of the dyes, these coatings could be very porous. Preferred electrodes for transparent window applications should have low haze, preferably lower than 0.5% as measured by ASTM method D1003. A method to prepare and deposit transparent and porous titania coatings from colloidal solutions is outlined in U.S. Pat. No. 5,828,482 and in the "$TiO_2$ films for User Controlled Photochromic Applications" authored by T. J. Gudgel, et al in the Proceedings of the SPIE (Society of Photo Optical Instrumentation Engineers, Bellingham, Wash.) Vol. 3788 (1999) which are incorporated herein by reference. For many electrochromic devices (such as mirrors and glass for automotive applications) low haze is required, preferably below 2% and most preferably below 1% for the coated substrate. Typically several oxides, particularly when deposited from pre-fabricated particulates suspended in a liquid can result in substantial optical haze. However, the above deposition methods result in coatings which are very clear. The haze is typically measured using American Society for Testing and Materials (ASTM) method D1003. The measurement is made when the coated substrate is in contact with air. The measurement can be made before or after incorporating the dye. The haze should be low in both cases. For example, as given in the above reference from SPIE, a titania coating in a thickness of 240 nm was deposited from a colloidal solution containing pre-formed titania (anatase phase). This coating was deposited on a conductively coated glass substrate (TEC 15 from Libbey Owens Ford of Toledo, Ohio) and in contact with the conductive coating. The haze of the substrate before titania coating deposition was 0.53% and after coating 0.27%. The measurement was made on a Hunterlab (Reston, Va.) spectrometer Colorquest II. In another method, a solution could be made which contains the precursor of the inorganic oxide. The dyes are either chemically attached to this precursor or dissolved in the solution. The coatings are formed by dipping, spraying or spinning these solutions on the substrates, followed by solvent evaporation. These coatings may further be heat treated to get rid of residual solvent and/or promoting further reactions. The coatings may even incorporate flexible groups which are polar so that good compatibility with the organic electrolytes is obtained. Such an exemplary moiety is polyethylene oxide.

One may even assemble electrochromic devices using the electrochromic electrodes as described in WO98/35267, which for example are titania and other semiconductors with viologen bonded on to their surfaces. In this case the counterelectrode of the electrochromic device can be any of those described in this disclosure earlier which were suitable for tungsten oxide. Alternatively the counterelectrodes could be anodic polymers such as conductive polymers, e.g., polyaniline and its derivatives. Examples of other anodic polymers and the way to make electrochromic devices is described in WO96/13754 which is incorporated herein by reference. The major difference from WO96/13754 is that rather than including the cathodic compound in the electrolyte, the cathodic material (titania with viologen incorporation) is deposited as a coating on the conductive electrode counter to the polyaniline electrode. The anodic polymer may even be replaced by an anodic coloring oxide containing at least one of nickel oxide and vanadium oxide.

The Examples which follow are intended as an illustration of certain preferred embodiments of the invention, and no limitation of the invention is implied.

Improved Kinetics

EXAMPLE 1, and COMPARATIVE EXAMPLES C1 and C2

Device construction, 0.1 LiO+WO electrode and electrolyte:

A 3 in.×3 in. piece of conductive doped tin oxide coated glass (TEC8), available from Libbey Owens Ford (Toledo, Ohio), was coated with a thin film of 0.1 LiO+WO by a wet-chemical method described below. A tungsten peroxyester was prepared as described in U.S. Pat. No. 5,277,986, the disclosure of which is incorporated by reference herein. A coating solution was made by dissolving 350 g of the tungsten peroxyester precursor in 1 liter of reagent ethanol. After the precursor was completely dissolved, 4.82 g of lithium methoxide was added to the precursor solution to form a coating solution. The substrate was coated by dipping in the coating solution. The coating was then fired under humid conditions to 135° C. as described in the U.S. Pat. No. 5,277,986. The coating thickness was between 450 to 500 nm.

A portion of the fired coating was etched away from the conductive surface around the perimeter. This etched area was then primed with a silane or other equivalent organometallic containing primer to enhance adhesion with the glue as described later. Two holes about 0.125 inch (0.32 cm) in diameter were drilled in the opposite corners of a second 3 in.×3 in. (7.62 cm×7.62 cm) piece of TEC8 glass. The conductive surface around the perimeter of this second substrate was also etched and primed as described above.

The cell was assembled by sealing these two substrates at the edges with an epoxy glue with their conductive coatings facing inward. The epoxy primarily touched the primed areas described above. As an alternative, the priming step could be omitted by adding the silane used in the primer directly to the epoxy glue. The spacing between the substrates was controlled by inserting 1 mm thick glass strips as spacers at the edges. The substrates, being of the same dimensions, were translated (shifted) relative to each other so as to be slightly offset thereby providing accessible areas to anchor electrical leads. The assembled substrates were clamped and the epoxy was cured thermally in an oven at 120° C. for one hour in air. Several such cells were prepared without the electrolyte.

The prepared cells were then filled with the liquid electrolytes shown in the table below. All percentages used herein are by weight unless specifically stated otherwise.

| Component | Comp. Ex. C1 | Com. Ex. C2 | Ex. 1 |
|---|---|---|---|
| Propylene Carbonate | 59.04% | 58.88% | 58.88% |
| Sulfolane | 39.40% | 39.34% | 39.30% |
| Lithium perchlorate | 0.43% | 0.42% | 0.43% |
| Ferrocene | 0.15% | 0.38% | 0.38% |
| Ferrocenium hexafluorophosphate | — | — | 0.03% |
| Deionized water | 0.98% | 0.98% | 0.98% |

Figure 1:
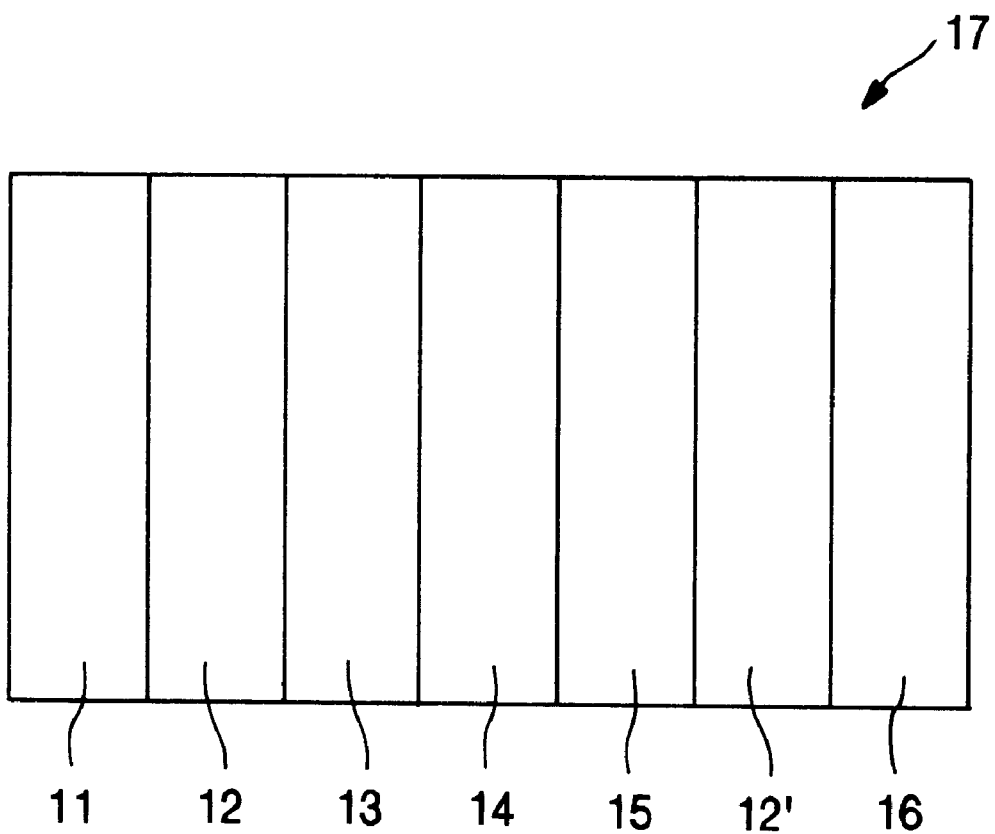
FIG. 1 is a schematic diagram of a typical prior art electrochromic device.
Figure 2:
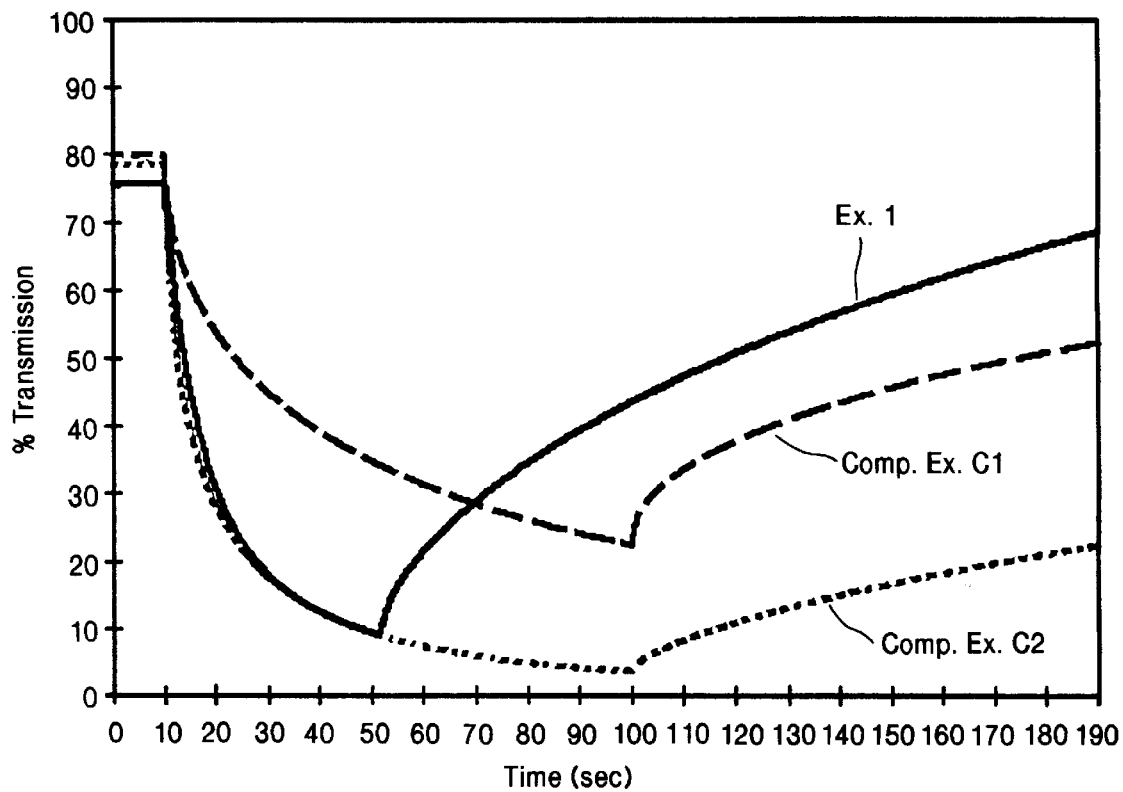
FIG. 2 is a graphical representation of the kinetic traces (% transmission v. elapsed time in seconds) of cells formed from an example of this invention, along with traces from comparative examples.

The filling holes were plugged with Teflon balls. The area around the plug hole was primed to enhance adhesion. A UV curable glue was poured on the plugs and covered with glass cover slides (which were also primed for improved adhesion). The glue was then cured by subjecting the plug area to UV radiation. Electrical wires were then soldered on to the offset areas formed as described above. The kinetic traces of these cells are shown in FIG. 2. The results show that Example 1 with the additive ferrocenium hexafluorophosphate bleached the fastest—faster than either Comparative Example C1 or C2.

EXAMPLE 2 and COMPARATIVE EXAMPLE C3

PSSNa overcoated 0.1 LiO+WO electrode:

Devices similar to Example 1 were made, except that the 0.1 LiO+WO electrode was overcoated with a polystyrenesulfonate-sodium salt (PSSNa) coating. These devices are described in PCT application WO 97/38350. The PSSNa coating was deposited by spin coating a 5% solution (by weight) of 500,000 molecular weight PSSNa in deionized (DI) water. A mixture of 1:1 by weight of water and reagent ethanol optionally could be used instead of pure water. The PSSNa solution also contained 0.01% by weight of a surfactant Triton X100 (available from Aldrich Chemical Co., Milwaukee, Wis.). The PSSNa coating was also etched from the perimeter area prior to priming as described in Example 1. In these devices, hard rubber spacers rather than glass strips were used in the corners to control the gap between the substrates. The electrolyte compositions were:

| Component | Electrolyte composition for 210 micron electrolyte thickness Comp. Ex. C3 | Electrolyte composition for 850 micron electrolyte thickness Ex. 2 |
| --- | --- | --- |
| Propylene Carbonate | 52.82% | 53% |
| Sulfolane | 35.25% | 35.3% |
| Polymethyl methacrylate (PMMA) with an inherent viscosity of 1.38 deciliter | 9.76% | 9.80% |
| Lithium perchlorate | 0.47% | 0.47% |
| Ferrocene | 0.82% | 0.41% |
| Ferrocenium hexafluorophosphate | — | 0.02% |
| Deionized water | 0.88% | 1% |

Figure 3:
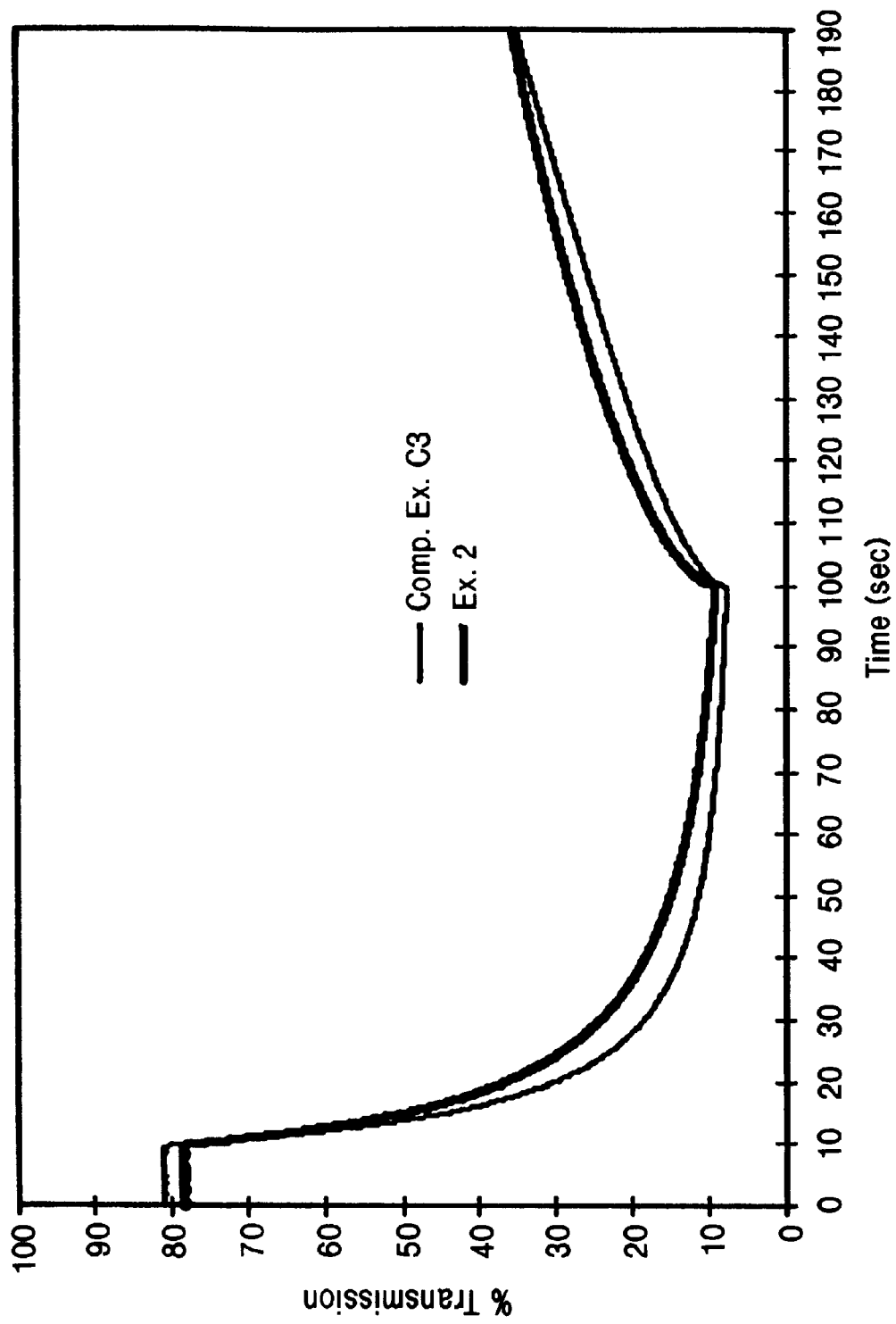
FIG. 3 is a graphical representation of the kinetic traces (% transmission v. elapsed time in seconds) of cells formed from an example of this invention and a comparative example.

FIG. 3 shows kinetic traces for the cells taken at 550 nm wavelength. Smaller gaps tend to produce faster kinetics than larger gaps. Example 2 had a larger gap (850 micron electrolyte layer) than Comparative Example C3 (210 micron electrolyte layer). The results show that Example 2 containing ferrocenium hexafluorophosphate nevertheless bleached with substantially similar kinetics to Comparative Example C3.

EXAMPLE 3

A 3 in.×6 in. (7.62 cm×15.24 cm) device (similar in construction as described in Example 1) was constructed with uneven electrolyte spacing. The spacing (along the 3 inch (7.62 cm) edge) between the substrates at one end was 1.3 mm while the spacing was 0.7 mm at the other end. This was done by curing the epoxy seal in the cells with a thicker spacer at one end as compared to the other end.

The device was filled with the following electrolyte:

| Component | Ex. 3 |
| --- | --- |
| Propylene Carbonate | 53.14% |
| Sulfolane | 35.51% |
| Polymethyl methacrylate (PMMA) with an inherent viscosity of 1.38 deciliter | 9.73% |
| Lithium Perchlorate | 0.38% |
| Ferrocene | 0.24% |
| Ferrocenium hexafluorophosphate | 0.02% |
| Deionized water | 0.97% |

Figure 4:
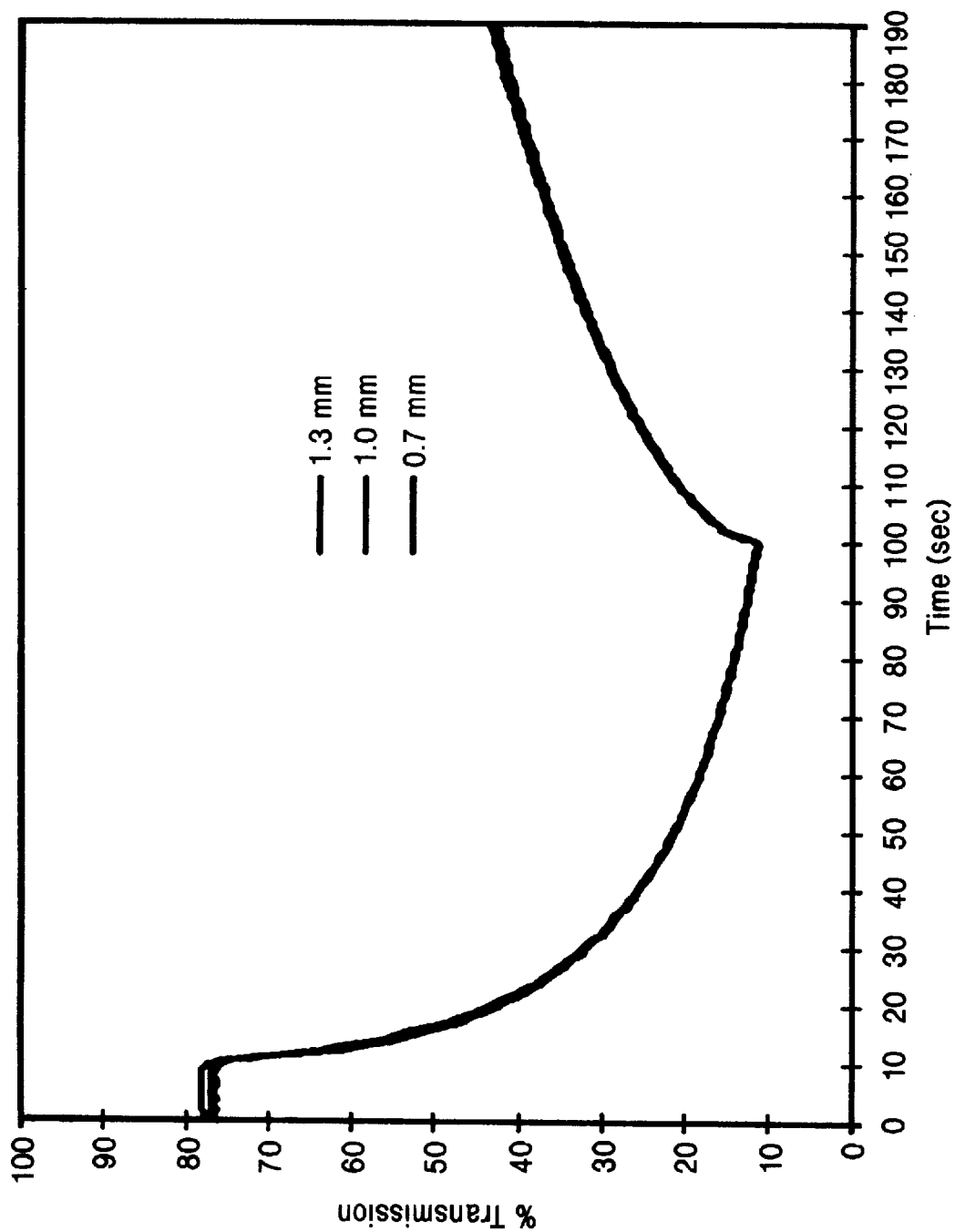
FIG. 4 is a graphical representation of the kinetic traces (% transmission v. elapsed time in seconds) of the different gap thicknesses (1.3 mm, 1.0 mm, and 0.7 mm) found in a cell formed from an example of this invention.

Example 3 only varied 2% in transmission of light at 550 nm wavelength from the example's thicker edge to its thinner edge. As shown in FIG. 4, there were virtually no differences in the kinetics and in the light transmission of the colored state among the different gap thicknesses (1.3 mm, 1.0 mm, and 0.7 mm). Thus, although Example 3 had large variations in the thicknesses of the electrolyte layer, the resulting variation of the depth of coloration and kinetics with thickness was advantageously negligible.

As describe previously, such variations in thickness can be caused in practice by non-uniformity in the substrates used. If strengthened or tempered glass substrates are used, for example, they might not be flat enough to maintain a uniform gap. As another example, substrates that are bent to form a curved cell might not be perfectly matched in curvature, leading to electrolyte gap variations. Thus, as shown by the results of Example 3, this invention can prevent variations in EC cell gap (electrolyte thickness) from affecting cell optical and kinetic properties.

EXAMPLES 4A, 4B, 4C, 4D, and COMPARATIVE EXAMPLE C4

Several devices were fabricated similar to that described in Example 1. The substrates used were ITO coated soda-lime glass (12 ohms/sq.). The electrolyte composition in the cells were as formed from the following constituents:

| Electrolyte component | Comp. Ex. C4 | Ex. 4A | Ex. 4B | Ex. 4C | Ex. 4D |
| --- | --- | --- | --- | --- | --- |
| Propylene carbonate | 44.92% | 44.88% | 44.84% | 44.77% | 44.69% |
| Sulfolane | 31.76% | 31.73% | 31.71% | 31.65% | 31.60% |
| Poly-methylmethacrylate** | 7.56% | 7.55% | 7.54% | 7.53% | 7.52% |
|  | 0.47% | 0.47% | 0.47% | 0.47% | 0.47% |
| Ferrocene | 0.59% | 0.59% | 0.58% | 0.58% | 0.58% |
| Ferrocenium tetrafluoroborate | 0.00% | 0.09% | 0.17% | 0.34% | 0.51% |
| Lithium perchlorate | 0.07% | 0.07% | 0.07% | 0.07% | 0.07% |
| Lithium tetrafluoroborate | 0.24% | 0.24% | 0.24% | 0.24% | 0.23% |
| Tetrabutylammonium tetrafluoroborate | 10.37% | 10.36% | 10.35% | 10.33% | 10.31% |
| Uvinul 3000* | 4.04% | 4.03% | 4.03% | 4.02% | 4.02% |
| Bleach speed (% T/sec) | 0.55 | 0.77 | 1.05 | 2.0 | 2.72 |

*Uvinul 3000 is a UV stabilizer available from BASF Corp. (Parsippany, NJ).
**PMMA - had a $\overline{M}w$ of 463,000 and Mn of 167,000

Figure 5A:
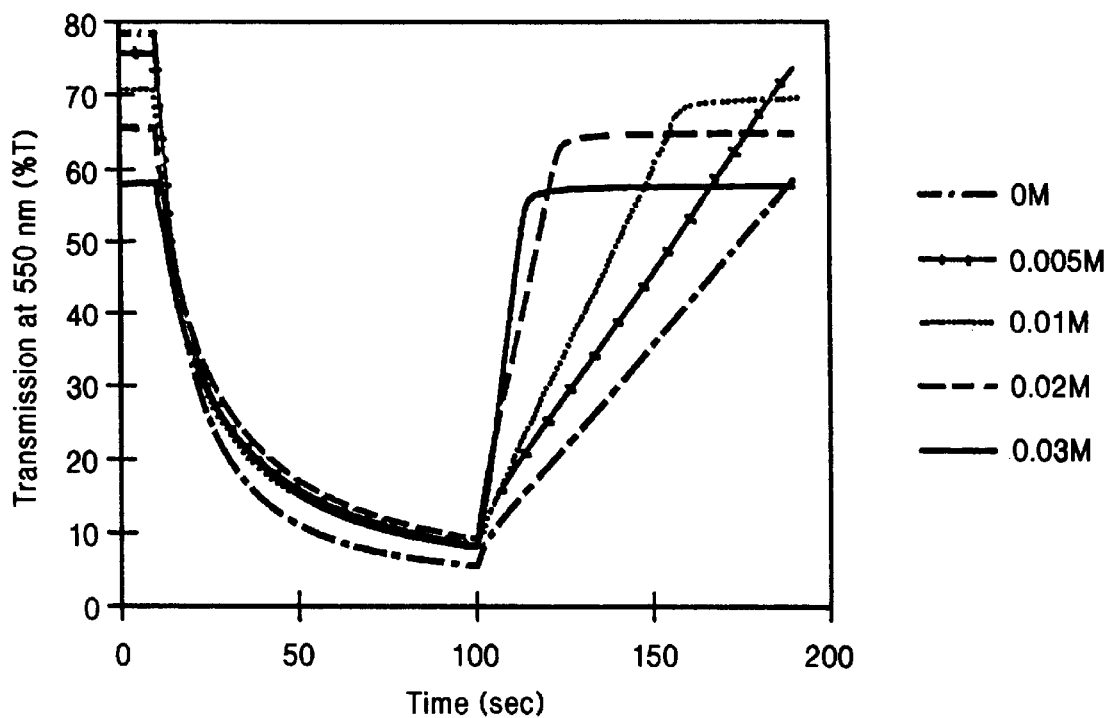
FIG. 5a is a graphical representation of the modulation kinetics for light at 550 nm wavelength of devices for various ferrocenium tetrafluoroborate concentrations.
Figure 5B:
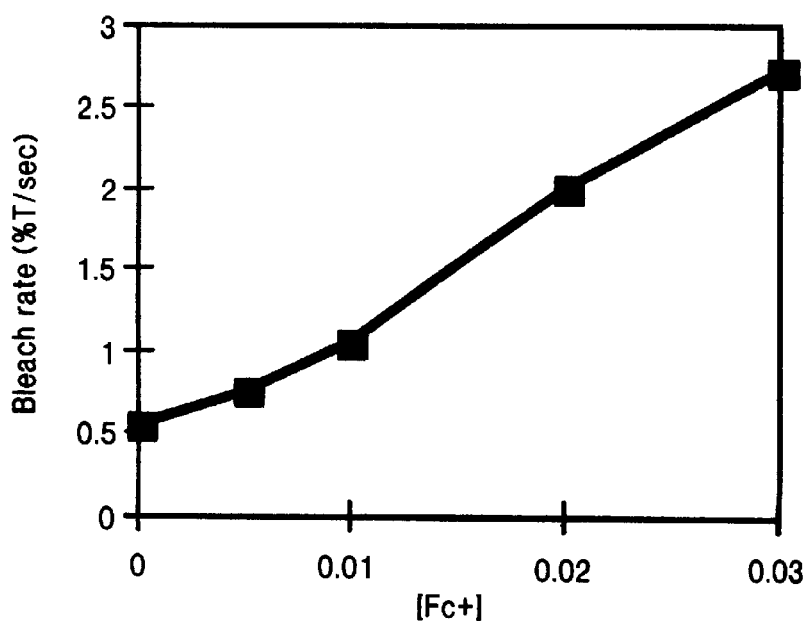
FIG. 5b is a graphical representation of the bleaching rates as a function of ferrocenium tetrafluoroborate concentration.

The modulation kinetics of each device for light at 550 nm wavelength are shown in FIG. 5a. The figure shows that the kinetics are faster with increasing ferrocenium tetrafluoroborate concentration. As seen in FIG. 5b, the bleaching rate also increases with increasing ferrocenium tetrafluoroborate concentration.

UV Durable

EXAMPLE 5

Formation of coating precursors:

Examples 5–17 used EC coatings deposited by a wet-chemical method, similar to that described above in Example 1, by dissolving 350 g of the tungsten peroxyester precursor in 1 liter of reagent ethanol, adding 4.82 g of lithium methoxide to the precursor solution, and stirring at room temperature for two hours to form the coating solution. This amount of lithium corresponded in p/r of 0.1. This quantity of lithium methoxide can be adjusted proportionally to provide different p/r ratios.

The coatings were deposited onto conductive transparent substrates such as ITO or TEC glass by spin, dip or roller coating. The thickness of the coatings were varied between 10 and 1000 nm. Preferably, the thickness of the coatings was about 500 nm.

Each coating was then fired under humid conditions to 135° C. as described previously. In the Examples, coatings heated to higher temperatures were first subjected to the humid treatment at 135° C. The subsequent higher temperature treatments were then conducted in a standard atmosphere unless otherwise specified.

EXAMPLE 6

A tungsten/copper oxide coating was prepared having the composition $Cu_{0.064}W_{0.93}O_y$ by adding 9 g of peroxotungstic ethoxide to 30 ml of dry ethanol and 0.198 g of copper(II) methoxide. The mixture was stirred at room temperature for two hours to complete dissolution. The resulting solution was a light green color which was spin coated under ambient atmosphere onto 2 inches×2 inches (5.1 cm×5.1 cm) ITO coated glass substrates at 1200 rpm.

The coated substrate was then heated under humid conditions to 135° C. The thickness of the resulting coating was 350 nm. The charge capacity was determined in a three electrode cell configuration where the counterelectrode was platinum, the reference electrode was $Ag/AgNO_3$ and the electrolyte was 0.1 molar $LiClO_4$ in propylene carbonate. From an insertion step potential of 1.3 volts the charge capacity was determined to be 1,005 $C \cdot cm^{-3}$. Under this degree of reduction the coating had a % T of 19.7% for light at 550 nm wavelength.

EXAMPLE 7

A tungsten oxide coating containing potassium having the composition $K_{0.1}W_{0.9}O_y$ was prepared by reacting 0.28 g of potassium ethoxide with 9.0 g of peroxotungstic ethoxide in 30 ml of dry ethanol. The mixture was dissolved by being sonicated at about 40° C. for 30 minutes and then stirred at room temperature for twelve hours. The solution was filtered using a 0.1 micron filter and spin coated at 1000 rpm onto 3 inches×3 inches (7.6 cm×7.6 cm) ITO coated glass substrates and fired under humid conditions to 135° C. The thickness of the resulting coating was 415 nm. The coating had 84% T for light at 550 nm wavelength. When colored at a step potential of 1.3 volts, as described in Example 6, the % T was 8.8 for 550 nm light.

EXAMPLE 8

A tungsten oxide coating containing sodium having the composition $Na_{0.1}W_{0.9}O_y$ was prepared by reacting 0.23 g of sodium ethoxide with 9.0 g of peroxotungstic ethoxide in 30 ml of dry ethanol. The mixture was stirred at room temperature for twelve hours to form a clear yellow solution. The solution was filtered using a 0.1 micron filter and spin coated at 1000 rpm onto 2 inches×2 inches (5.1 cm×5.1 cm) ITO coated glass substrates and fired under humid conditions to 135° C. The thickness of the resulting coating was 330 nm. For light at 550 nm wavelength, the coating had a % T of 78. When colored at a step potential of 1.3 volts, as described in Example 6, its % T was 14 for light at 550 nm.

EXAMPLE 9

A tungsten oxide coating containing lithium having the composition $Li_{0.1}W_{0.9}O_y$ was prepared by reacting 0.13 g of lithium methoxide with 9.0 g of peroxotungstic ethoxide in 30 ml of dry ethanol. The mixture was stirred at room temperature for two hours to form a clear yellow solution. The solution was filtered using a 0.1 micron filter and spin coated at 500 rpm onto 2 inches×2 inches (5.1 cm×5.1 cm) ITO coated glass substrates and fired under humid conditions to 135° C. The thickness of the resulting coating was 550 nm. The coating had an 84% T for light at 550 nm wavelength. When colored at a step potential of 1.3 volts, as described in Example 6, its % T was 3 for light at 550 nm.

EXAMPLE 10

A tungsten oxide coating containing barium having the composition $Ba_{0.1}WO_{0.9}O_y$ was prepared by dissolving 9.0 g of peroxotungstic ethoxide in 30 ml of dry ethanol. To this solution, at room temperature, was added 0.45 g of barium metal. The mixture was stirred for twelve hours to produce a clear yellow solution. The solution was filtered with a 0.2 micron filter and spin coated at 1000 rpm onto 2 inches×2 inches ITO coated glass substrates. The coating was fired under humid conditions to 135° C. The resulting coating was 450 nm thick. Under a step potential of 1.3 volts, as described in Example 6, the charge capacity of the coating was determined to be 9,956 $C \cdot cm^{-3}$. Under the 1.3 v. degree of reduction, the % T was 18.8 for light at 550 nm wavelength.

EXAMPLE 11

Fabrication of Cells

The experiments below, to Example 18, were conducted on cells that employed a redox promoter in the electrolyte. The cells consisted of EC windows fabricated using two substrates coated with a transparent conductor that was either Indium/Tin Oxide (available from Applied Films, Boulder, Co.) or TEC glass (available from Libbey Owens Ford, Toledo, Ohio). In each of the cells, one of the substrates was further coated with tungsten oxide before being assembled into the cell. The cells were produced by a process similar to that described above in Example 1.

EXAMPLES 12A and 12B

Lithium and lithium copper doped tungsten oxide precursor solutions were prepared by dissolving 100 g of PTE and 1.3671 g of lithium methoxide in 250 ml of ethanol. For the copper doped solution 0.4139 g of copper methoxide was added. Coatings were fabricated as described in Example 5. The cells were made as described in Example 11 and their stability to UV is described in the Table below. The electrolyte composition was propylene carbonate and sulfolane (in a ratio of 60:40 by volume) in which 1 molar lithium perchlorate and 10 wt % polymethylmethacrylate were added.

Other electrolyte compositions can be used containing other additives such as, for example, different lithium and sodium salts, water, UV stabilizers, colorants, pigments and different polymers, as known in the art. Further, an in-situ polymerizable composition as is also known in the art can also be used. These additives can influence the UV properties as tested in this and other examples. However, the improvement of UV properties as demonstrated in the Examples would still be observed even with different electrolyte.

The cells were exposed to solar radiation and their optical transmission of light at 550 nm wavelength were measured periodically. The results below show that the addition of copper substantially reduced the detrimental photochromic effect.

| | Bleached transmission (% @ 550 nm) | |
| --- | --- | --- |
| Hours exposed to UV | Ex. 12A (0.3 Li, 0.01 Cu, W)O$_y$ (Processed at 250° C.) | [EX. 12B] (0.3 Li, W)O$_y$ (Processed at 250° C.) |
| 0 | 83.2 | 81.3 |
| 6 | 82.4 | 70.9 |
| 20 | - - - | 64.8 |
| 28 | 82.0 | - - - |
| 60 | - - - | - - - | the ratios described above are atomic ratios

Further, the coatings without copper, but containing higher amounts of lithium were less photochromic.

EXAMPLES 13A, 13B, 13C, and COMPARATIVE EXAMPLE C5

Electrochromic cells with tungsten oxide coatings of various compositions were made as described in Example 1. The electrode coatings were fabricated as described in Example 5 except that a thin layer of copper-containing $WO_3$ was first deposited on the ITO surface. The $CU/WO_3$ coatings were prepared as described in Examples 12A and 12B and had a thickness of 20 nm after being fired. On top of this thin coating was deposited a lithium-containing $WO_3$ coating formed in a manner as described in Example 5. The specific details of each Example are listed in the Table below. The coatings were incorporated into electrochromic cells as described in Example 12 and the cells tested under UV exposure.

|  | Comp. Ex. C5 | Ex. 13A | Ex. 13B | Ex. 13C |
|---|---|---|---|---|
| Thin layer between EC layer and ITO surface | None | $(Cu_{0.02}WO_{0.98})O_y$ 135° C. | $(Cu_{0.01}WO_{0.99})O_y$ 135° C. | $(Cu_{0.01}WO_{0.99})O_y$ 250° C. |
| EC Layer | $(Li_{0.1}WO_{0.9})O_y$ 135° C. Thickness 450 nm | $(Li_{0.1}WO_{0.9})O_y$ 135° C. Thickness 420 nm | $(Li_{0.3}WO_{0.7})O_y$ 250° C. Thickness 665 nm | $(Li_{0.3}WO_{0.7})O_y$ 250° C. Thickness 595 nm |
| Hours exposed to UV | % T (550 nm) | % T (550 nm) | % T (550 nm) | % T (550 nm) |
| 0 | 79.3 | 84.6 | 82.3 | 82.7 |
| 6 | 59.2 | --- | 76.6 | 77.32 |
| 8 | --- | 81.0 | --- | --- |
| 28 | 39.7 | --- | 70.3 | 71.5 |
| 32 | --- | 75.3 | --- | --- |

The results show that the Examples 13A, 13B, and 13C, with the thin coating of copper-containing tungsten oxide had an effective resistance to change when subjected to UV. Additionally, the surfaces of the underlying coatings can also provide other advantages over the prior art such as improved adhesion and better control of interfacial stress. The thin coat can also minimize changes in EC coating thickness during processing, particularly when wet-chemical methods are used to deposit the coats.

EXAMPLES 14A, 14B, 14C, and 14D

In these Examples 14A, 14B, 14C, and 14D, tungsten oxide coatings were prepared containing A) barium oxide, B) potassium oxide, C) lithium oxide and D) copper oxide as described in Examples 10, 7, 9 and 6, respectively. The coatings were incorporated into cells as described in Example 12. The cells were exposed to solar radiation and the change in transmission of light at 550 nm wavelength were recorded as a function of time as listed in Table 3 below:

TABLE 3

| Cell Type | Ex. 14A $(Ba_{0.1}W_{0.9})O_y$ | Ex. 14B $(K_{0.1}W_{0.9})O_y$ | Ex. 14C $(Li_{0.1}W_{0.9})O_y$ | Ex. 14D $(Cu_{0.1}W_{0.9})O_y$ |
|---|---|---|---|---|
| Time Exposed to UV (hours) | % T at 550 nm | | | |
| 0 | 83 | 82 | 80 | 75 |
| 16 | 73 | 66 | 70 | 73 |
| 56 | 67 | 59 | 62 | 71 |

The results all show resistance to UV induced deterioration of light transmittance. Example 14D, with the copper-containing tungsten oxide, had the best resistance to transmittance change when subjected to UV radiation.

EXAMPLE 15

An electrochromic coating having a composition $(Li_{0.1}Cr_{0.1}W_{0.8})O_y$ was prepared by first reacting 0.696 g of chromium(II) acetate monohydrate in 20 ml of ethanol with 4 ml of 30 wt % $H_2O_2$ at 0° C. The product was isolated under vacuum at 60° C. and dissolved in 30 ml of ethanol. To this solution, 10.2 g of peroxotungstic ethoxide and 0.16 g of lithium methoxide were added. The solution was filtered using a 0.2 micron filter and resulted in a stable precursor solution which could be used under ambient conditions. The solution was spin coated at 500 rpm onto 3 inches×3 inches (7.6 cm×7.6 cm) ITO and fired to 135° C. under humid conditions. The resulting fired coating thickness was 661 nm.

EXAMPLE 16

An electrochromic coating having a composition $(Li_{0.1}Co_{0.1}W_{0.8})O_y$ was prepared by reacting 0.922 g of cobalt(II) acetate tetrahydrate in 30 ml of ethanol with 10.2 g of peroxotungstic ethoxide and 0.16 g of lithium methoxide. The solution was filtered using a 0.2 micron filter and resulted in a stable precursor solution which could be used under ambient conditions. The solution was spin coated at 500 rpm onto 2 inches×2 inches (5.1 cm×5.1 cm) ITO and fired to 135° C. under humid conditions. The resulting fired coating thickness was 710 nm.

EXAMPLE 17

The optical and electrochromic properties of coatings having the compositions $(Li_{0.1}Cr_{0.1}W_{0.8})O_y$ and $(Li_{0.1}Co_{0.1}W_{0.8})O_y$, prepared in Examples 15 and 16, were compared with those of a $(Li_{0.1}W_{0.9})O_y$ coating prepared as described in Example 9 by preparing cells in accordance with the technique described in Example 7 and the testing thereof. The data is summarized in Table 4 below. Also included in the table are the solar radiation exposure data for the $(Li_{0.1}W_{0.9})O_y$ and the $(Li_{0.1}Cr_{0.1}W_{0.8})O_y$ coatings. The coatings were colored under a step potential of 1.2 volts as described in Example 6.

TABLE 4

| | 1931 2° CIE standard illuminant A (eye response) | | Light Transmission as a function of UV Exposure | |
|---|---|---|---|---|
| Coating | Colored | Bleached | Time exposed to UV (hours) | % T at (550 nm) |
| $(Li_{0.1}W_{0.9}O)_y$ | 9.2 | 81.0 | 0 | 78 |
| | | | 62 | 50 |
| | | | 110 | 47 |
| $(Li_{0.1}Cr_{0.1}W_{0.8})O_y$ | 6.6 | 80.2 | 0 | 78 |
| | | | 62 | 68 |
| | | | 110 | 63 |
| $(Li_{0.1}Co_{0.1}W_{0.8})O_y$ | 6.7 | 80.0 | | |

Figure 11:
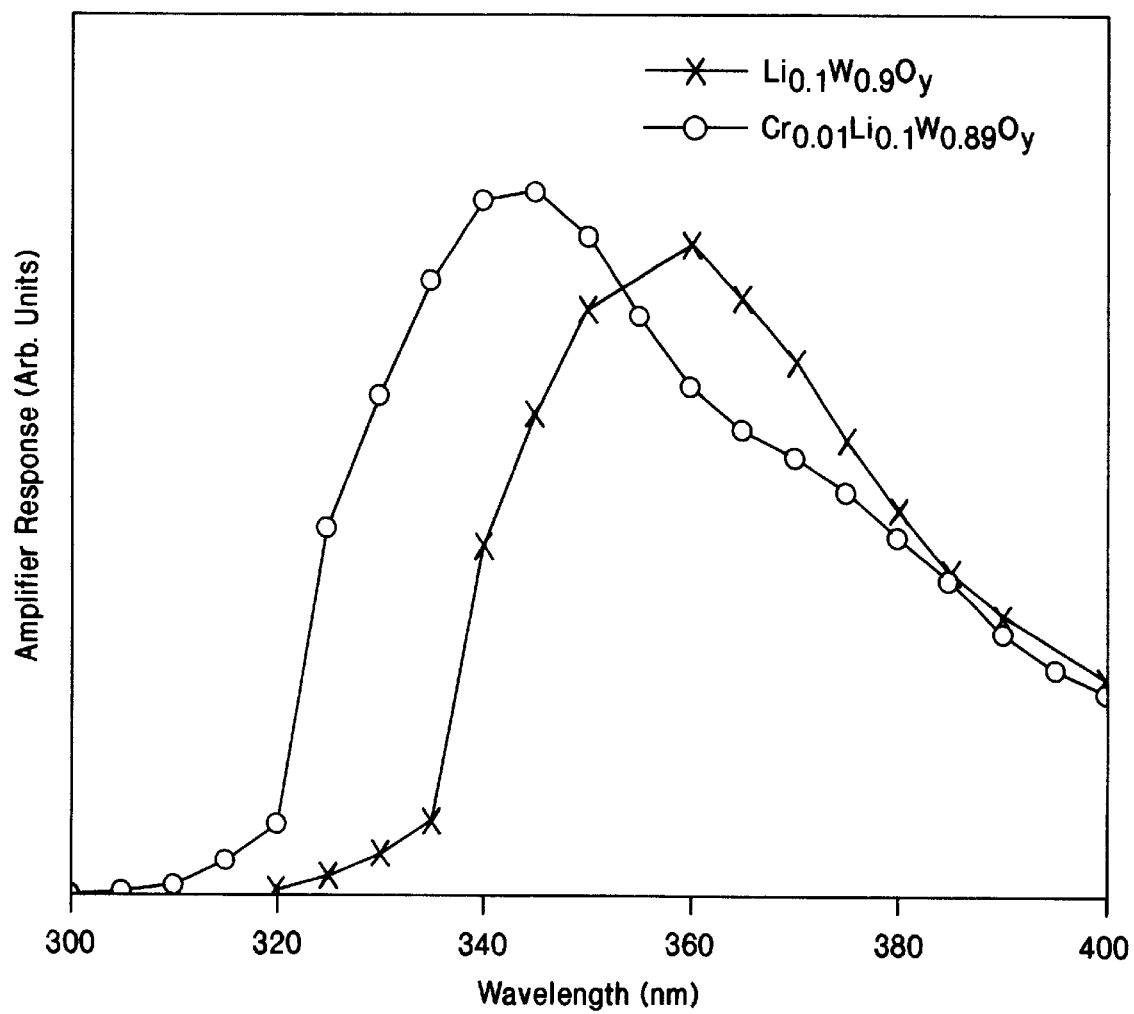
FIG. 11 is a graph illustrating the voltage generated by an electrochromic device of this invention when subjected to radiation of specific wave lengths.

The data in Table 4 show that, by adding Co and Cr to the EC coating, the optical modulation of the devices is were not reduced. Further, these coatings were incorporated in EC cells as described in Example 12 and exposed to UV. Further, the Cr-containing coating showed better resistance to change in LTV compared to the unadulterated $(Li_{0.1}Cr_{0.1}W_{0.9})O_y$ coating. FIG. 11 illustrates the voltage generated by the EC cell when subjected to the radiation of specific wavelengths. The results set forth in FIG. 11 show that the EC cell with chromium doped tungsten oxide is less sensitive to higher ultraviolet wavelengths as compared to the non-doped sample.

EXAMPLE 18

Figure 6:
FIG. 6 displays the transmission spectra of an embodiment of this invention in the colored and bleached state. Also shown in the figure is the colored spectrum for a comparison cell containing Li/$WO_3$ with a p/r of 0.3.

A tungsten oxide coating containing lithium was prepared as described in Example 5 except that the p/r was 0.5. After being fired under humidity, the resulting coating was again fired to 250° C. under ambient atmosphere. The resulting twice fired (under higher temperature) coating was incorporated into a cell configuration as described in Example 1. The transmission, for light at 550 nm wavelength, through the device was 73%. When colored for 100 seconds at 1.3 v the light transmission was 16.5%. The cell under a potential of zero volts bleached back to 73% T in 300 seconds. In the colored state the device had a neutral gray color. The transmission spectra of the cell in the colored and bleached state is shown in FIG. 6. Also shown in FIG. 6 is the colored spectrum for a cell containing $Li/WO_3$ with a p/r of 0.3. This cell when colored was blue.

Zirconium oxide has been added to tungsten oxide to impart neutral color in the colored state. Typical atomic concentration of Zr/W is less than 0.15 (WO99/08153). However, increasing concentration of Zirconium (within the above range) leads to a dramatic loss in the extent of coloration. It has been discovered that the addition of Zirconium along with alkali metal oxides of Li, Na and K result in novel compositions of open oxide networks which color well and also have a neutral gray color. These compositions can be further modified by adding $M_2$ as shown for composition 1 to enhance UV stability (i.e., $M_3$ oxide is a mixture of tungsten and zirconium oxides). Of course, addition of $M_4$ as in composition 2, where only W and Zr oxide mixtures are used can also result in enhancing the UV stability. Along similar lines novel combinations can be formed when zirconium is substituted in part or completely by vanadium. In WO97/22906 it was shown that the combination of tungsten and vanadium oxides also color to a neutral gray color.

Counterelectrodes

EXAMPLE 19

A vanadium oxide coating was prepared by dissolving 5 ml of vanadium triisopropoxide oxide, $[(CH_3)_2CHO]_3VO$, in 50 ml of isopropanol under dry nitrogen. The solution was stirred for twelve hours and spin coated onto ITO coated glass with a sheet resistance of 12Ω/p. The coating was heat treated at a heating rate of 5° C./minute to 250° C. The resulting coating was amorphous and yellow in color. A 125 nm thick coating had a 50% transmission for light at 550 nm wavelength. Lithium was inserted into the coating under potential limits of −1 to 2 volts with respect to $Ag/AgNO_3$ reference electrode. The electrolyte was 0.01 molar $LiClO_4$ in propylene carbonate. Under these conditions the charge capacity was calculated to be 1,180 C·cm$^{-3}$.

EXAMPLE 20

A vanadium oxide coating was prepared as described in Example 19 except that the coating was fired to 350° C. in a second firing. This resulted in a crystalline coating that was yellow in color. From a current versus voltage plot, between the potential limits of −1 and 2 volts, at a scan rate of 10 mV/s, the apparent charge capacity was calculated to be 2,242 C·cm$^{-3}$. The coating showed a slight electrochromic behavior on insertion and/or extraction of lithium.

EXAMPLE 21

A metal oxide coating (xLi+zV)O was prepared. The molar ratio of lithium to vanadium was 0.54. The $((Li_{0.35}V_{0.65})O_y$ coating was prepared by adding 40 ml of isopropyl alcohol, 2 ml of 2,4-pentanedione, and 5 ml of vanadium triisopropoxide oxide to a flask under nitrogen. The mixture was stirred at room temperature for one hour. Then, 1.18 g of lithium 2,4-pentanedione was added. The solution was heated to 40° C., and 1 ml of glacial acetic acid was added, to form the spin deposition solution.

The resulting solution was spin coated onto ITO coated glass and heated to 250° C. under ambient atmosphere. From a current versus voltage analysis, between the potential limits −1 and 2 volts, at a scan rate of 0.1 mV/s, the charge capacity was determined to be 3,900 C·cm$^{-3}$.

EXAMPLE 22

A coating was prepared as described in Example 21 except that the sodium alkali metal ion was used instead of lithium. The $(Na_{0.35}V_{0.65})O_y$ coating was prepared by dissolving 5 ml of vanadium triisopropoxide oxide and 2.06 ml of 2,4-pentanedione in 60 ml of isopropyl alcohol. The mixture was allowed to react for 1 hour and 0.253 g of sodium metal was added. This resulted in a vigorous reaction with the evolution of hydrogen gas. The reaction was completed in about one hour and the mixture was left to stand under nitrogen for 24 hours. The solution was spin coated onto ITO coated soda-lime glass substrate and fired to 250° C. for one hour. The fired coating on the substrate was colorless and had a % T value of 65 as measured against standard Illuminant A and a solar % T air mass 2 (AM2) value of 49. On insertion of lithium, the coating changed from colorless to light brown. The charge capacity was calculated to be 13,700 C·cm$^{-3}$.

EXAMPLE 23

A potassium vanadate coating was prepared by reacting 2.9 ml of vanadium triisopropoxide oxide, with 1 g of potassium acetate, in 50 ml of a 50/50 mixture of ethanol and isopropyl alcohol at 60° C. under nitrogen. The mixture was stirred for 48 hours. Then 8 ml of glacial acetic acid was added and the mixture heated at 70° C. for 30 minutes. This resulted in a light green clear solution which was deposited by spin coating onto ITO.

The coating was fired to 350° C. for one hour in air. The heating rate was 5° C./minute. The resulting coating thickness was 70 nm. The coating was colorless and had a slight brown tint in the reduced state. The charge capacity of the coating was determined under cyclic voltammetry at two different scan rates between the potential limits of −1.2 to 2.5 volts. The reference electrode was Ag/AgNO$_3$ and the counterelectrode was Pt. The electrolyte was 0.1 molar LiClO$_4$ in propylene carbonate. At a scan rate of 10 mV/s the charge capacity was 1,893 C·cm$^{-3}$, while the charge capacity was 3,694 C·cm$^{-3}$ at 2 mV/s.

EXAMPLE 24

A coating was prepared as described in Example 21 except that barium was used as the additive material. The $(Ba_{0.35}V_{0.65})O_y$ coating was prepared by reacting 2.88 g of barium metal with 60 ml of dry ethanol. The reaction was vigorous with the evolution of hydrogen gas. On cessation of gas evolution, 8 ml of vanadium triisopropoxide oxide and 2 ml of N-dimethyl formamide was added. The mixture was heated to 60° C. for 30 minutes and cooled to room temperature to produce a clear orange solution. This solution was spin coated onto ITO coated substrate and heated to 250° C. under ambient atmosphere for one hour. The resulting fired coating was slightly brown in color. Its charge capacity was calculated to be 961 C·cm$^{-3}$.

EXAMPLE 25

A thin film coating of composition $(Nb_{0.35}V_{0.65})O_y$ was prepared by dissolving 5 ml of vanadium triisopropoxide oxide and 4.09 ml of 2,4-pentanedione in 60 ml of isopropyl alcohol. The mixture was allowed to react for 1 hour and then 3.53 ml of niobium (V) ethoxide was added to produce a clear red solution. After spin deposition on ITO, the coating was fired to 250° C. for one hour under ambient atmosphere. The coating had a slight yellow tint and a charge capacity of 1,000 C·cm$^{-3}$.

EXAMPLE 26

A niobium vanadate thin film was prepared as described in Example 24 except that the coating was fired to 350° C. for one hour under ambient atmosphere. The coating had a slight yellow tint. Under lithium insertion, the coating had a charge capacity of 1,055 C·cm$^{-3}$ and was highly reversible.

EXAMPLE 27

A niobium vanadate coating with a Nb/V ratio equal to one (unity) was prepared by reacting vanadium triisopropoxide oxide with niobium (V) chloride in dry isopropyl alcohol. 25.5 g of niobium chloride was slowly added to 250 ml of isopropyl alcohol while stirring under nitrogen. The mixture was stirred for two hours and 22.8 ml of vanadium triisopropoxide oxide added. This resulted in a red solution. The solution was heated at 60° C. under nitrogen for 48 hours resulting in a green solution. This solution was filtered through a 0.1 micron filter and spin coated onto an ITO coated substrate. The coating was fired to 250° C. under an ambient atmosphere for one hour at a heating rate of 10° C./min. The resulting coating on the substrate appeared colorless and had a thickness of 190 nm. The charge capacity for lithium insertion was determined to be 1,360 C·cm$^{-3}$.

EXAMPLE 28

A niobium vanadate coating (y:z=1) solution was prepared as described in Example 27 except that, after heating at 60° C. for 48 hours, NaOH dissolved at varied concentrations in ethanol was slowly added to the green solution. This resulted immediately in a white precipitate (composed substantially of NaCl) and a more basic pH.

The resulting solutions were filtered and spin coated onto ITO substrates and fired to 250° C. for one hour at a heating rate of 10° C./minute under ambient air. The coatings appeared colorless on the substrate with an 86% transmission of light at 550 nm wavelength. Depending on the amount of chlorine removed from the solution (in the form of sodium chloride) through the addition of NaOH the charge capacity of the coating could be optimized. The electrolyte was 0.4 molar LiClO$_4$ in propylene carbonate.

TABLE 5

| NaOH (Molar) | 0.0 | 0.3 | 0.4 | 0.45 | 0.5 | 0.55 | 0.6 |
|---|---|---|---|---|---|---|---|
| Thickness (nm) | 190 | 130 | 110 | 100 | 85 | 80 | 70 |
| Charge Capacity (C · cm$^{-3}$) | 1,360 | 1,400 | 1,850 | 1,960 | 1,960 | 1,920 | 910 |

EXAMPLE 29

An electrochromic transmissive device was fabricated using a NbVO$_y$ coating prepared as described in Example 27, with a thickness of 250 nm, as the counterelectrode. The working electrode WO$_3$ used was deposited by a wet-chemical method. The precursor (tungsten peroxyester) for this was prepared as described in U.S. Pat. No. 5,277,986, the disclosure of which is incorporated by reference herein.

The coating solution was made by dissolving 350 g of the precursor in 1 liter of reagent ethanol. The coatings contained lithium which was added in the form of lithium methoxide to the precursor solution. When the precursor was completely dissolved, 4.82 g of lithium methoxide was added and stirred at room temperature for two hours to form the coating solution. This amount of lithium corresponded to a W/Li of 0.1. The coatings were deposited onto ITO substrates fired under humid conditions to 135° C. as described above. The LiWO$_3$ thickness was 450 nm. The fired coating thickness was between 450 to 500 nm. A cell was then made out of the two electrodes by etching the coating from the conductive surface around the perimeter. This area was then primed with a silane primer to enhance adhesion with the glue as described below.

Two holes about 0.125 inch (0.32 cm) in diameter were drilled in opposite corners of the 3 in.×3 in. (7.62 cm×7.62 cm) NbVO$_y$ coated substrate. Prior to cell assembly, the NbVoy electrode was reduced with lithium in a two or three electrode cell configuration. Alternative reducing methods as described in U.S. Pat. No. 5,780,160, incorporated herein by reference, can be used. The methods include, for example, in-situ reduction by the electrolyte, in-situ reduction in the cell prior to the introduction of the electrolyte, and reduction while depositing the coating.

In this example, electrochemical reduction was by a nickel electrode in a bath filled with 0.4 molar LiClO$_4$ in propylene carbonate. The NbVO$_y$ was reduced with 0.9 coulombs of lithium. A cell was assembled by sealing the NbVO$_y$ and LiWO$_3$ coated substrates, with coatings facing inward, at the edges with an epoxy glue. The epoxy primarily touched the primed areas described above.

The spacing between the substrates was controlled by inserting 53 micron spacers in the sealing epoxy. The substrates, having the same dimensions, were slightly offset to provide a place to anchor the electrical leads. The substrates were clamped and the epoxy was cured at 25° C. for one hour in air.

The cells were filled with an electrolyte composed of 0.01 molar $LiClO_4$ in propylene carbonate. Other additives such as UV stabilizers, fillers, polymers, and monomers, for example, optionally could also be added to the electrolyte. Many such additives are described in patent application EP 0612826A1. After filling, the filling holes were plugged with Teflon balls. The area around the plug hole was primed with a methacrylic based silane primer to enhance adhesion. A UV curable glue was poured on the plugs and covered with glass cover slides (which were also primed for improved adhesion). The glue was then cured by subjecting the plug area to UV radiation at 8 $W/cm^2$ for 30 seconds. Electrical wires were then soldered on to the offset areas described above.

The cell was colored by applying a coloring potential of 1.2 volts. The transmission of light at 550 nm went from 60.5% to 9.4% in 90 seconds and, by applying a bleaching potential of −1.2 volts, it went back to 60.5 % T in 120 seconds.

EXAMPLE 30

A vanadium oxide thin film containing tantalum was prepared with a tantalum/vanadium ratio of 0.54. The $(Ta_{0.35}V_{0.65})O_y$ coating was prepared by reacting 5 ml of vanadium triisopropoxide oxide with 4.13 ml of 2,4-pentanedione and 2.88 ml of tantalum (V) ethoxide in isopropyl alcohol. The mixture was stirred at room temperature under dry nitrogen for one hour and spin coated onto ITO coated glass substrates. The inorganic oxide network was formed by heating to 250° C. for one hour under ambient atmosphere. The film was 140 nm thick and 50% transmitting for light at 550 nm wavelength. Its charge capacity was calculated to be 407 $C·cm^{-3}$.

EXAMPLE 31

A coating composed of $(Ta_{0.35}V_{0.65})O_y$ was prepared as described in Example 30 with the exception that the coating was heated to 350° C. for one hour under ambient atmosphere. The coating had a solar % T (AM2) equal to 48%. The coating had light brown color. Under lithium insertion the coating had a charge capacity of 2,067 $C·cm^{-3}$.

EXAMPLE 32

A rhenium vanadate coating was prepared, having a molar ratio of Re to V equal to 0.25, by first reacting 8 g of rhenium metal with a 50/50 mixture of $H_2O_2$ (30 vol %) and glacial acetic acid at 0° C. The resulting mixture was allowed to react for 90 minutes. The reaction mixture was then slowly warmed to room temperature and reacted for an additional 24 hours. The excess hydrogen peroxide and acetic acid were removed under reduced pressure at 60° C. to leave a yellow liquid of the rhenium complex. The rhenium complex was added to an isopropyl alcohol solution of vanadium triisopropoxide oxide such that the molar concentration of rhenium was 20%. The resulting solution was spin coated onto an ITO coated substrate and fired by being heated to 200° C. for one hour under ambient atmosphere. The thickness of the fired coating was 120 nm. The coating was light green in color and had a charge capacity of 965 $C·cm^{-3}$.

EXAMPLE 33

A copper(II) vanadate film was prepared, having a molar ratio of Cu to V equal to 0.54, by dissolving 3.54 g of copper(II) n-butyrate in 80 ml of dry isopropyl alcohol and then adding 3.28 g of vanadium triisopropoxide oxide and 1 g of water. The solution was stirred under nitrogen at room temperature for 12 hours prior to spin coating onto conductive tin oxide coated glass. The coating was fired to 350° C. for one hour under ambient atmosphere. The thickness of the coating was 146 nm. The charge capacity for lithium insertion at a scan rate of 0.1 mV/s was calculated to be 2,186 $C·cm^{-3}$.

EXAMPLE 34

A ferrocene counterelectrode was prepared as follows. Ferrocene was dilithiated with 2 equivalents of n-butyl lithium in presence of tetramethylene diamine for 12 hours at room temperature. The reaction was quenched with an excess of trimethoxychlorosilane. The crude product was dissolved in methanol, the solution was filtered, and thin films were spun on TEC20 substrates. Condensation was believed to proceed according to Scheme 1, and was performed by first exposing the films to HCl, gas for 3 hours and then heating the films for one day at 80–100° C.

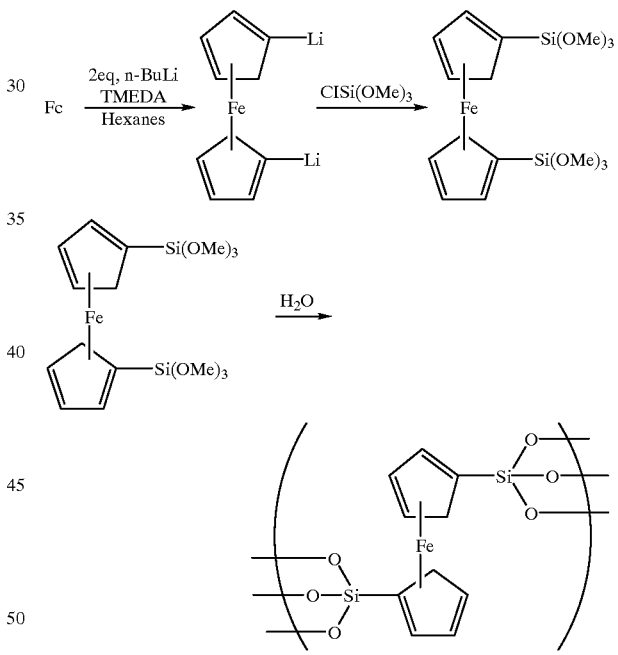

Scheme 1

The cyclic voltammetry of these films (100 nanometers) showed a well-defined redox wave at +1.0 V vs. Ag/AgCl in PC 1M LiTfO.

One cell was made with LTW03 and a Fc counterelectrode. The initial modulation was from 70% to 30% T, and the kinetics was very fast.

EXAMPLE 35

Ferrocene counterelectrodes were prepared by reacting functionalized ferrocene in a sol-gel network. Two functionalized ferrocenes were prepared: a silyated material containing alkoxysilane groups and ferrocene carboxylic acid.

(a) SILYLATED FERROCENE

Silylated ferrocene was prepared by the following reaction:

Fc—CH$_2$OH+(EtO)$_3$SiCH$_2$CH$_2$CH$_2$NCO→Fc—CH$_2$OCONHCH$_2$CH$_2$CH$_2$Si (OEt)$_3$

Ferrocenemethanol was refluxed with a slight excess of 3-(triethoxysilyl)propyl isocyanate (1 ferrocene: 1.05 isocyanate molar ratio) in MEK for 90 minutes. After this time, the solvent was stripped off in a rotary is evaporator to yield a brown liquid. FTIR analysis indicated that the reaction was complete by the disappearance of the —Oh and —NCO bands and the appearance of the urethane band.

The silyated ferrocene was incorporated into a base matrix of PEG$_4$/LiClO$_4$/ZrO$_2$. Prior to reaction, the PEG$_4$ was also silyated with 3-(triethoxysilyl)propyl isocyanate as described above for the ferrocene methanol:

HO—[CH$_2$CH$_2$O]$_4$—H+2(EtO)$_3$SiCH$_2$CH$_2$CH$_2$NCO

↓

(EtO)$_3$SiCH$_2$CH$_2$CH$_2$NHCOO—[CH$_2$CH$_2$O]$_4$—CONHCH$_2$CH$_2$CH$_2$Si (OEt)$_3$

A coating solution was prepared by the following reaction scheme:

Fc—CH$_2$OCONHCH$_2$CH$_2$CH$_2$Si (OEt)$_3$/MeOH

H$_2$O/H+↓ silylated PEG$_4$↓

H$_2$O/H+↓

Zr(O"Pr)$_4$/HOAc↓

LiClO$_4$↓

The resulting solution was then spin coated on TEC 15 at various speeds, followed by curing at 125° C. for 30 minutes. Films up to ~4 micrometers were obtained after curing. These films were fabricated into EC cells with WO$_3$ as an electrochromic electrode. Tungsten oxide was deposited by a dip process onto a TEC 15 substrate. The cell was fabricated as described in earlier examples. The electrolyte thickness of the EC cells was 210 microns. The electrolyte consisted of 50.6% propylene carbonate, 35.8% sulfolane, 9% polymethylmethacrylate, 3–5% UVinul 3000, 0.7% water, 0.3% LiBF$_4$ and 0.1% LiClO$_4$ by weight.

Thinner films (0.65 and 0.13 μm) with a longer cure (125° C./8 hrs) were also prepared. These were much harder and stable in the electrolyte compared to using the milder cure conditions. They colored at ~2.5V but only with a limited degree of modulation. The high voltages required to color these films indicated that the poor conductivity of the matrix was the major problem. To investigate this, similar films were deposited on a porous conducting undercoat.

The undercoat was a sol-gel derived Sb—SnO$_2$ coating deposited on TEC 15. Two different spin-coating speeds were used to obtain thinner and thicker films. The ferrocene counterelectrode was then deposited on top to give the following configuration:

Ferrocene/Porous SnO$_2$ Counterelectrode

| |
|---|
| ferrocene film |
| porous SnO$_2$ |
| TEC 15 |
| glass |

These film configurations colored at 1.3 V. The films had low leakage currents of approximately 0.5 mA, indicating that the ferrocene had been successfully immobilized.

(b) CHELATED FERROCENE FILMS

A ferrocene carboxylic acid—Zr alkoxide counterelectrode was prepared. This material is based on the chelation of the ferrocene carboxylic acid to Zr n-propoxide as shown below:

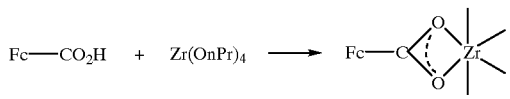

Coating solutions were prepared by refluxing ferrocene carboxylic acid and Zr n-propoxide, at 1:1 and 1:2 molar ratios of Zr:Fc, in MEK. Films were then spin coated on TEC 15 and cured at 125° C. for 8 hours. The resulting coatings, up to 1 μm thick, were hard and stable in the electrolyte and colored at 1.3 V.

Other variations and modifications of this invention will be apparent to those skilled in this art after careful study of this application. This invention is not to be limited except as set forth in the following claims.

What is claimed:

1. A method to enhance the kinetics of an electrochromic device having at least an electrolyte layer comprising an anodic compound and a cathodic electrochromic layer, said method comprising the step of:
   adding an augmenting amount of an oxidizer to the electrolyte layer in an amount effective to enhance a bleaching rate of the electrochromic layer.

2. A method to enhance the kinetics of an electrochromic device having at least an electrolyte layer comprising a cathodic compound and an anodic electrochromic layer, said method comprising the step of:
   adding an augmenting amount of a reducer to the electrolyte layer in an amount effective to enhance a bleaching rate of the electrochromic layer.

3. An electrochromic device comprising:
   two conducting layers, at least one of which is transparent, having at least an electrochromic layer and an electrolyte layer disposed therebetween, said electrolyte layer containing an augmenting amount of an oxidizer effective to enhance a bleaching rate of said electrochromic layer.

4. The electrochromic device according to claim 3, wherein said electrochromic layer is comprised of WO$_3$, said electrolyte layer is comprised of ferrocene and said oxidizer is a ferrocenium salt.

5. An electrochromic device comprising:
   two conducting layers, at least one of which is transparent, having at least an electrochromic layer and an electrolyte layer disposed therebetween, said electrolyte layer containing an augmenting amount of a reducer effective to enhance a bleaching rate of said electrochromic layer.

6. The electrochromic device according to claim 5, wherein said electrochromic layer is comprised of polyaniline or its derivatives.

7. An electrochromic device exhibiting reduced photochromism, said electrochromic device comprising:

a first conducting layer and a second conducting layer, at least one of said conducting layers being transparent an electrochromic layer formed from an oxide of tungsten or molybdenum disposed between the first and second conducting layers; and a photochromism reducing layer disposed between the transparent conducting layer and the electrochromic layer, formed from an oxide of tungsten or molybdenum doped with at least one of lithium, sodium, or potassium, cobalt, chromium, copper or barium.

8. The electrochromic device according to claim 7, wherein said photochromism reducing layer has a thickness from about 5 nm to about 100 nm.

9. An electrochromic device exhibiting reduced photochromism, compared to a device without a layer of an oxide of $M_2$, said electrochromic device comprising:

a first conductor layer and a second conductor layer, at least one of said conductor layers being transparent;

an electrochromic layer formed from an oxide of tungsten or molybdenum disposed between said first and second conductor layers; and a photochromism reducing layer disposed between the transparent conductor layer and the electrochromic layer, said photochromism reducing layer formed from an oxide of $M_2$, effective to reduce photochromism, wherein $M_2$ is an element of Group 2A or an element of the $4^{th}$ period in a standard periodic table of the elements.

10. The electrochromic device according to claim 9, wherein said photochromism reducing layer has a thickness from about 5 nm to about 100 nm.

11. The electrochromic device according to claim 9, wherein $M_2$ is at least one of barium, vanadium, chromium, cobalt, or copper.

12. An electrochromic device comprising a UV resistant electrochromic layer disposed between two conductor layers, at least one of which is transparent, said electrochromic layer formed from a composition described by formula:

$$p(\text{oxide of } M_1) + q(\text{oxide of } M_2) + r(\text{oxide of } M_3) \quad (I)$$

wherein $M_1$ is at least of lithium, sodium, or potassium;

$M_2$ is an element of Group 2A or an element of the $4^{th}$ period in a standard periodic table of the elements;

$M_3$ is at least one of tungsten or molybdenum;

the atomic ratio p/r of $M_1$ to $M_3$, is in the range of from about 0.01 to about 2; and the atomic ratio q/r of $M_2$ to $M_3$ is in the range of from 0.001 to 0.5.

13. The electrochromic device according to claim 12, wherein the atomic ratio p/r of $M_1$ to $M_3$ is in the range of from about 0.1 to about 1.

14. The electrochromic device according to claim 12, wherein the atomic ratio q/r of $M_2$ to $M_3$ is in the range of from about 0.01 to about 0.2.

15. An electrochromic device comprising a UV resistant electrochromic layer disposed between two conducting layers, at least one of which is transparent, said electrochromic layer formed from a composition described by formula:

$$q(\text{oxide of } M_4) + r(\text{oxide of } M_3) \quad (II)$$

wherein $M_3$ is at least one of tungsten or molybdenum;

$M_4$ is barium, chromium, cobalt, or copper; and the atomic ratio q/r of $M_4$ to $M_3$ is in the range of from about 0.001 to about 0.5.

16. The electrochromic device according to claim 15, wherein the atomic ratio q/r of $M_4$ to $M_3$ is in the range of from about 0.01 to about 0.2.

17. An electrochromic device comprising two conducting layers, at least one of which is transparent, having disposed therebetween an electrochromic layer and a counterelectrode where the counterelectrode is formed from a composition described by formula:

$$x(\text{oxide of } M_5) + y(\text{oxide of } M_6) + z(\text{oxide of vanadium}) \quad (III)$$

wherein $M_5$ is at least one of lithium, sodium, potassium, rubidium, or cesium;

$M_6$ is at least one of barium, tantalum, copper, niobium, rhenium, titanium, cesium, cobalt, nickel, irridium or chromium;

the atomic ratio x/z of $M_5$ to vanadium is in the range of from about 0.01 to about 1; and the atomic ratio y/z of $M_6$ to vanadium is in the range of from about 0.1 to about 0.8.

18. The electrochromic device according to claim 17, wherein $M_5$ is at least one of lithium, sodium, or potassium.

19. An electrochromic device comprising two conducting layers, at least one of which is transparent, having disposed therebetween an electrochromic layer and a counterelectrode formed from a composition described by formula:

$$x(\text{oxide of } M_5) + z(\text{oxide of vanadium}) \quad (IV)$$

wherein $M_5$ is at least one of lithium, sodium, potassium, rubidium, or cesium, provided $M_5$ may not be sodium unless $M_5$ is a mixture of oxides; and the atomic ratio x/z of $M_5$ to vanadium is in the range of from about 0.01 to about 1.

20. The electrochromic device according to claim 19, wherein $M_5$ is at least one of lithium, sodium, or potassium.

21. An electrochromic device comprising two conducting layers, at least one of which is transparent, having disposed therebetween an electrochromic layer and a counterelectrode formed from a composition described by formula:

$$y(\text{oxide of } M_7) + z(\text{oxide of vanadium}) \quad (V)$$

wherein $M_7$ is at least one of barium, copper or rhenium;

the atomic ratio y/z of $M_7$ to vanadium is in the range of from about 0.1 to about 0.8; and wherein said composition is formed by a liquid phase reaction.

22. An electrochromic device comprising two conducting layers, at least one of which is transparent, having disposed therebetween (i) an electrochromic layer comprised of at least one of tungsten oxide, molybdenum oxide and niobium oxide and (ii) a counterelectrode comprised of an inorganic oxide matrix with a dye incorporated therein.

23. An electrochromic device comprising two conducting layers, at least one of which is transparent, having disposed therebetween (i) an electrochromic layer comprised of conductive polymer and (ii) a counterelectrode comprised of an inorganic oxide matrix with a dye incorporated therein.

24. The electrochromic device according to claim 23, wherein said conductive polymer is polyaniline or a derivative thereof.

25. A counterelectrode for an electrochromic device comprising at least one inorganic oxide and an incorporated dye, wherein said counterelectrode has a haze of less than 1% as measured by ASTM method D1003.

* * * * *